US009942209B2

(12) United States Patent
Chew et al.

(10) Patent No.: US 9,942,209 B2
(45) Date of Patent: Apr. 10, 2018

(54) TECHNOLOGIES FOR SECURE EXTENSIBLE INTER-DEVICE I/O REDIRECTION ACROSS A NETWORK

(71) Applicant: Intel Corporation, Santa Clara, CA (US)

(72) Inventors: Yen Hsiang Chew, Georgetown (MY); Murugayah Kanapathy, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/866,864

(22) Filed: Sep. 26, 2015

(65) Prior Publication Data

US 2016/0315922 A1  Oct. 27, 2016

Related U.S. Application Data

(60) Provisional application No. 62/153,083, filed on Apr. 27, 2015.

(51) Int. Cl.
*H04L 9/32* (2006.01)
*H04L 29/06* (2006.01)

(52) U.S. Cl.
CPC ........ *H04L 63/061* (2013.01); *H04L 63/0428* (2013.01); *H04L 63/08* (2013.01)

(58) Field of Classification Search
CPC .... H04L 63/061; H04L 63/0428; H04L 63/08
See application file for complete search history.

(56) References Cited

U.S. PATENT DOCUMENTS

| 2005/0251561 | A1* | 11/2005 | Hanes | G06F 3/0607 709/217 |
| 2006/0234631 | A1* | 10/2006 | Dieguez | H04W 76/023 455/41.2 |
| 2012/0311051 | A1* | 12/2012 | Banks | H04W 4/14 709/206 |

(Continued)

FOREIGN PATENT DOCUMENTS

| WO | WO 2015/135337 A1 * | 11/2014 | ............... H04L 9/00 |
| WO | WO 2015135337 A1 * | 9/2015 | ............. H04B 1/385 |

*Primary Examiner* — Kambiz Zand
*Assistant Examiner* — Arezoo Sherkat
(74) *Attorney, Agent, or Firm* — Barnes & Thornburg LLP

(57) ABSTRACT

Technologies for secure I/O redirection include a provider device, a consumer device, an authentication server, and a messaging server. The provider device and the consumer device establish an authenticated I/O redirect pairing. The authentication server authenticates the consumer device, and, if authenticated, generates a pairing identifier and provides the pairing identifier to the provider device and the consumer device. The redirect pairing is associated with the shared pairing identifier, a shared encryption key, and one or more shared message topics. The provider device and the consumer device subscribe to the messaging server as publisher and/or listener using the shared message topics. The provider device and the consumer device encrypt I/O data using the shared encryption key and encapsulate the encrypted I/O data into messages using the shared message topics. The provider device and the consumer device exchange the messages using the messaging server. Other embodiments are described and claimed.

7 Claims, 10 Drawing Sheets

(56) References Cited

U.S. PATENT DOCUMENTS

| | | | | |
|---|---|---|---|---|
| 2014/0007209 A1* | 1/2014 | Zucker | ............... | H04W 12/06 726/7 |
| 2014/0052993 A1* | 2/2014 | Isozaki | ............... | H04L 63/0428 713/175 |
| 2014/0273957 A1* | 9/2014 | Reitz | ............... | H04W 4/008 455/411 |
| 2015/0127835 A1* | 5/2015 | Zwaal | ............... | H04L 67/142 709/227 |
| 2015/0332258 A1* | 11/2015 | Kurabi | ............... | G06Q 20/382 705/71 |
| 2016/0127331 A1* | 5/2016 | Liu | ............... | H04B 1/385 713/171 |
| 2016/0275459 A1* | 9/2016 | Buil | ............... | H04L 12/282 |

\* cited by examiner

TECHNOLOGIES FOR SECURE EXTENSIBLE INTER-DEVICE I/O REDIRECTION ACROSS A NETWORK

CROSS-REFERENCE TO RELATED APPLICATION

The present application claims priority under 35 U.S.C. § 119(e) to U.S. Provisional Patent Application Ser. No. 62/153,083, entitled "SECURE EXTENSIBLE INTER-DEVICE I/O REDIRECTION ACROSS A NETWORK," which was filed on Apr. 27, 2015.

BACKGROUND

In current computing systems, I/O operations may be rerouted between remote computing devices over a network, allowing peripherals or other I/O devices to be remotely accessed. I/O rerouting is commonly used in virtualization applications (e.g., rerouting an application input/output from a virtual machine to a physical machine's device). Some previous I/O redirection systems include Universal Plug and Play (UPnP) protocols. UPnP protocols do not include a security element for secure authentication and pairing between an application and a remote application or device driver. In addition, UPnP is built on top of a HTTP protocol stack which is more suitable for human-to-machine interaction, and not as a middleware for application-to-application or application-to-driver interaction (e.g. lower-level applications and device drivers may not pair efficiently with an HTTP protocol stack).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
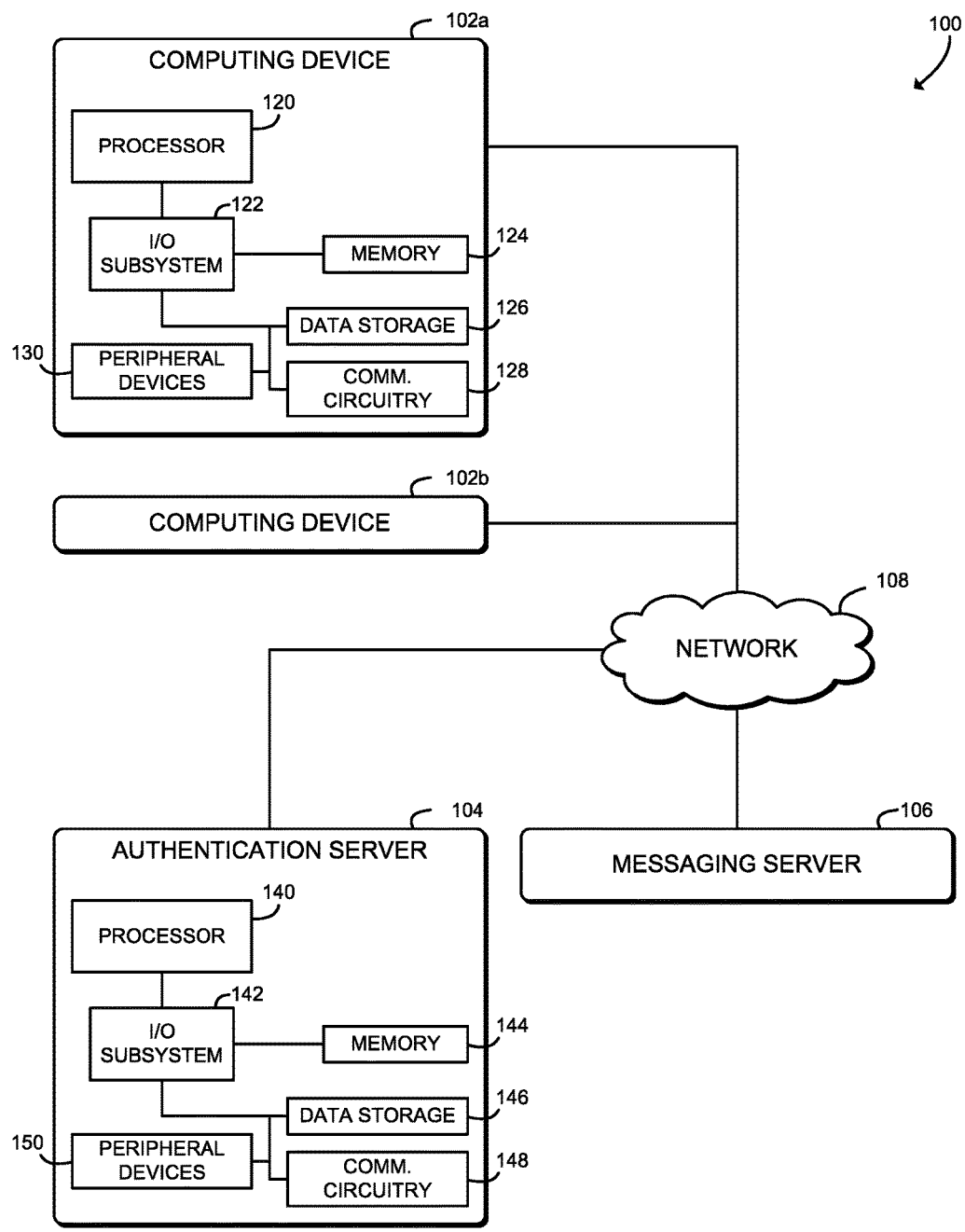
FIG. 1 is a simplified block diagram of at least one embodiment of a system for secure extensible inter-device I/O redirection.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for secure extensible I/O redirection includes two or more computing device 102, an authentication server 104, and a messaging server 106 in communication over a network 108. In use, as described in more detail below, the computing devices 102a, 102b execute a handshake operation to perform a secure key exchange and identify a common message broker (e.g., the messaging server 106). The computing devices 102a, 102b may perform different handshaking procedures when located in close proximity and when not located in close proximity. After the handshake, the computing device 102a (the provider device) allows the computing device 102b (the consumer device) to remotely access I/O devices such as peripherals by exchanging encrypted messages through the intermediate messaging server 106. Thus, the system 100 may provide a secure technique to automatically pair applications with I/O devices across a network. The system 100 may provide application- and device-driver-agnostic pairing, and thus may be scalable across multiple applications and devices. Additionally, by supporting multiple message transfer protocols, the system 100 may support different network conditions and requirements (e.g., different transport media, varying bandwidth, quality-of-service requirements, and other conditions). Additionally, although the illustrative system 100 includes a separate authentication server 104 and messaging server 106, it should be understood that in some embodiments the functions of those devices may be combined into a single server device or a single collection of server devices.

Each computing device 102 may be embodied as any type of device capable of performing the functions described herein. For example, each computing device 102 may be embodied as, without limitation, a computer, a workstation, a server computer, a point-of-sale device, a laptop computer, a notebook computer, a tablet computer, a smartphone, a mobile computing device, an embedded computing device, a desktop computer, a distributed computing system, a multiprocessor system, a consumer electronic device, a smart appliance, a virtual computing device, and/or any other computing device capable of secure I/O redirection. As shown in FIG. 1, each illustrative computing device 102 includes a processor 120, an I/O subsystem 122, a memory 124, and a data storage device 126. Of course, the computing device 102 may include other or additional components, such as those commonly found in a workstation (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The computing device 102 may also include a communication subsystem 128, which may be embodied as any communication circuit, device, or collection thereof, capable of enabling communications between the computing device 102 and other remote devices over the network 108. The communication subsystem 128 may be configured to use any one or more communication technology (e.g., wired or wireless communications) and associated protocols (e.g., Ethernet, Bluetooth®, Wi-Fi®, WiMAX, 3G, 4G, 5G, LTE, etc.) to effect such communication.

Each computing device 102 may further include one or more peripheral devices 130. The peripheral devices 130 may include any number of additional input/output (I/O) devices, interface devices, and/or other peripheral devices. For example, the peripheral devices 130 may include typical input/output devices such as a display, keyboard, mouse, touchscreen, printer, scanner, or other peripheral devices. In some embodiments, the peripheral devices 130 may include input/output devices typically used in a point-of-sale device, such as a thermal printer, a cash drawer, a transaction device, a barcode scanner, and/or other peripheral devices.

The authentication server 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the authentication server 104 includes components and devices commonly found in a server or similar computing device, such as a processor 140, an I/O subsystem 142, a memory 144, a data storage device 146, communication circuitry 148, and/or peripheral devices 150. Those individual components of the authentication server 104 may be similar to the corresponding components of the computing devices 102, the description of which is applicable to the corresponding components of the authentication server 104 and is not repeated herein so as not to obscure the present disclosure. Additionally, in some embodiments, the authentication server 104 may be embodied as a "virtual server" formed from multiple computing devices distributed across the network 108 and operating in a public or private cloud. Accordingly, although the authentication server 104 is illustrated in FIG. 1 as embodied as a single server computing device, it should be appreciated that the authentication server 104 may be embodied as multiple devices cooperating together to facilitate the functionality described below.

The messaging server 106 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Thus, the messaging server 106 includes components and devices commonly found in a server or similar computing device, such as a processor, an I/O subsystem, a memory, a data storage device, and/or communication circuitry. Those individual components of the messaging server 106 may be similar to the corresponding components of the computing devices 102 and/or the authentication server 104, the description of which is applicable to the corresponding components of the messaging server 106 and is not repeated herein so as not to obscure the present disclosure. Additionally, in some embodiments, the messaging server 106 may be embodied as a "virtual server" formed from multiple computing devices distributed across the network 108 and operating in a public or private cloud. Accordingly, although the messaging server 106 is illustrated in FIG. 1 as embodied as a single server computing device, it should be appreciated that the messaging server 106 may be embodied as multiple devices cooperating together to facilitate the functionality described below.

As discussed in more detail below, the computing devices 102, the authentication server 104, and the messaging server 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Figure 2:
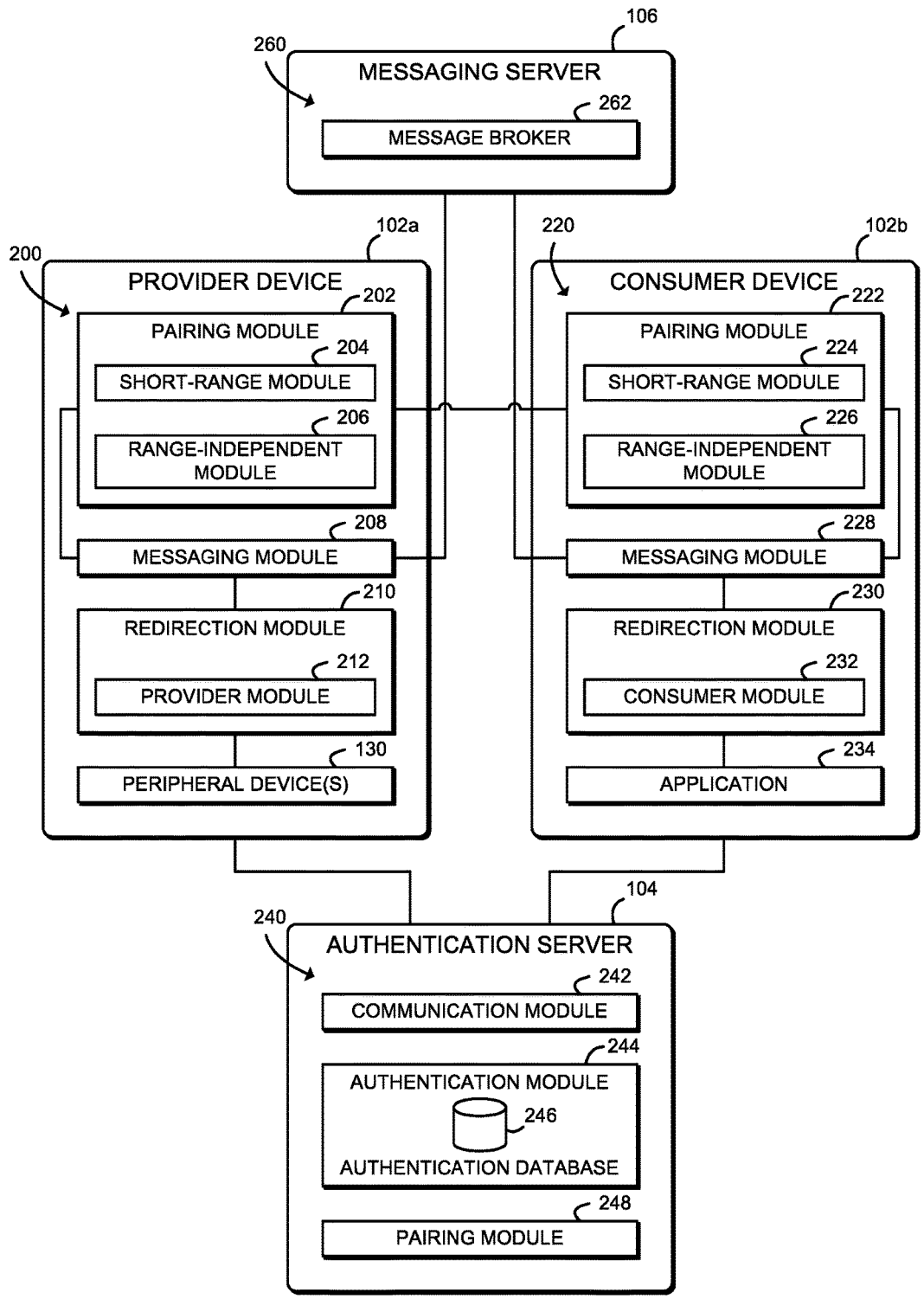
FIG. 2 is a simplified block diagram of at least one embodiment of various environments of the system of FIG. 1.

Referring now to FIG. 2, in the illustrative embodiment, the computing device 102 acting as the provider device (referred to hereafter as "the provider device 102a") establishes an environment 200 during operation. The illustrative embodiment 200 includes a pairing module 202, a messaging module 208, and a redirection module 210. The various modules of the environment 200 may be embodied as hardware, firmware, software, or a combination thereof. As such, in some embodiments, one or more of the modules of the environment 200 may be embodied as circuitry or collection of electrical devices (e.g., pairing circuitry 202, messaging circuitry 208, and/or redirection circuitry 210). It should be appreciated that, in such embodiments, one or more of the pairing circuitry 202, the messaging circuitry 208, and/or the redirection circuitry 210 may form a portion of one or more of the processor 120, the I/O subsystem 122, the memory 124, the data storage 126, the communication subsystem 128, and/or other components of the provider device 102a. Additionally, in some embodiments, one or more of the illustrative modules may form a portion of another module and/or one or more of the illustrative modules may be independent of one another.

The pairing module 202 is configured to establish an authenticated I/O redirect pairing with the consumer device 102b. As described further below, the I/O redirect pairing is associated with a shared pairing identifier, a shared encryption key, and one or more shared message topics. In some embodiments, the pairing module 202 may be configured to establish the authenticated I/O redirect pairing by establishing a secure close-range data channel with the consumer device 102b and then transmitting the unique identifier of the provider device 102a and the one or more message topics to the consumer device 102b and performing a secure key exchange with the consumer device 102b via the secure close-range data channel. The pairing module 202 may be further configured to receive the pairing identifier after transmitting the unique identifier to the consumer device 102b. In some embodiments, the pairing module 202 may be configured to generate the shared encryption key.

Additionally or alternatively, in some embodiments the pairing module 202 may be configured to establish the authenticated I/O redirect pairing by receiving a query for supported message topics from the authentication server 104, transmitting the one or more message topics to the authentication server 104 in response, receiving the encryption key from the authentication server 104, and receiving the pairing identifier from the authentication server 104. In some embodiments, those features may be performed by one or more sub-modules, such as a short-range module 204 and/or a range-independent module 206.

The messaging module 208 is configured to subscribe to a remote message broker 262 established by the messaging server 106 as a publisher and a listener using the shared message topics. Each shared message topic is indicative of the pairing identifier and an I/O device 130 of the provider device 102a. The messaging module 208 is further configured to intercept messages received from the remote message broker 262 and publish messages to the remote message broker 262 that correspond to the shared message topics. The messaging module 208 is further configured to switch from a local message broker (not shown) of the provider device 102a to the remote message broker 262 in response to establishing the authenticated I/O redirect pairing. The messaging module 208 may be further configured to unsubscribe from the remote message broker 262 in response to an un-pairing event associated with the authenticated I/O redirect pairing, remove the pairing identifier from the message topics to generate a message topic indicative of the I/O device 130 in response to the un-pairing event, and subscribe to a local message broker of the provider device 102a as a publisher and a listener for the message topic indicative of the I/O device 130.

The redirection module 210 is configured to decrypt messages intercepted from the remote message broker 262 using the shared encryption key to generate unencrypted I/O data. The unencrypted I/O data may be embodied as one or more I/O commands intended for an I/O device 130. The redirection module 210 is further configured to capture I/O data generated by the I/O device 130, encrypt the I/O data to generate encrypted I/O data using the encryption key, and encapsulate the encrypted I/O data into a message corresponding to a shared message topic. As described above, the messaging module 208 is configured to publish the message to the remote message broker 262. In some embodiments, those features may be performed by one or more sub-modules, such as a provider module 212.

Still referring to FIG. 2, in the illustrative embodiment, the computing device(s) 102 acting as the consumer device (referred to hereafter as "the consumer device 102b") establishes an environment 220 during operation. The illustrative embodiment 220 includes a pairing module 222, a messaging module 228, and a redirection module 230. The various modules of the environment 220 may be embodied as hardware, firmware, software, or a combination thereof. As such, in some embodiments, one or more of the modules of the environment 220 may be embodied as circuitry or collection of electrical devices (e.g., pairing circuitry 222, messaging circuitry 228, and/or redirection circuitry 230). It should be appreciated that, in such embodiments, one or more of the pairing circuitry 222, the messaging circuitry 228, and/or the redirection circuitry 230 may form a portion of one or more of the processor 120, the I/O subsystem 122, the memory 124, the data storage 126, the communication subsystem 128, and/or other components of the consumer device 102b. Additionally, in some embodiments, one or more of the illustrative modules may form a portion of another module and/or one or more of the illustrative modules may be independent of one another.

The pairing module 222 is configured to establish an authenticated I/O redirect pairing with the provider device 102a. As described further below, the I/O redirect pairing is associated with a shared pairing identifier, a shared encryption key, and one or more shared message topics. The pairing module 222 may be further configured to generate an un-pairing event associated with the authenticated I/O redirect pairing. In some embodiments, the pairing module 222 may be configured to establish the authenticated I/O redirect pairing by establishing a secure close-range data channel with the provider device 102a and then receiving the unique identifier of the provider device 102a and the one or more message topics from the provider device 102a and performing a secure key exchange with the provider device 102a via the secure close-range data channel. The pairing module 222 may be further configured to authenticate the consumer device 102b with the authentication server 104 and receive the pairing identifier from the authentication server 104 in response. In some embodiments, the pairing module 222 may be configured to generate the shared encryption key.

Additionally or alternatively, in some embodiments the pairing module 222 may be configured to establish the authenticated I/O redirect pairing by transmitting a request to access I/O devices 130 of the provider device 102a to the authentication server 104 and receiving the pairing identifier, the encryption key, and the message topics from the authentication server 104 in response. The request to the authentication server 104 identifies the provider device 102a, for example by including a unique identifier of the provider device 102a. In some embodiments, those features may be performed by one or more sub-modules, such as a short-range module 224 and/or a range-independent module 226.

The messaging module 228 is configured to subscribe to the remote message broker 262 established by the messaging server 106 as a publisher and a listener using the shared message topics. Each shared message topic is indicative of the pairing identifier and an I/O device 130 of the provider device 102a. The messaging module 208 is further configured to intercept messages received from the remote message broker 262 and publish messages to the remote message broker 262 that correspond to the shared message topics.

The redirection module 230 is configured to decrypt messages intercepted from the remote message broker 262 using the shared encryption key to generate unencrypted I/O data. The unencrypted I/O data may be embodied I/O data generated by an I/O device 130 of the provider device 102a. The redirection module 230 is further configured to provide the I/O data to an application 234 of the computing device. The application 234 may be embodied as any user application, system application, device driver, or other computer program of the consumer device 102b that may access the I/O device 130 of the provider device 102a. The redirection module 230 may be further configured to capture an I/O command generated by the application 234, encrypt the I/O command to generate an encrypted I/O command with the encryption key, and encapsulate the encrypted I/O command into a message that corresponds to the shared message topic. As described above, the messaging module 228 may be configured to publish the message to the remote message broker 262. In some embodiments, those features may be performed by one or more sub-modules, such as a consumer module 232.

Still referring to FIG. 2, in the illustrative embodiment, the authentication server 104 establishes an environment 240 during operation. The illustrative embodiment 240 includes a communication module 242, an authentication module 244, and a pairing module 248. The various modules of the environment 240 may be embodied as hardware, firmware, software, or a combination thereof. As such, in some embodiments, one or more of the modules of the environment 240 may be embodied as circuitry or collection of electrical devices (e.g., communication circuitry 242, authentication circuitry 244, and/or pairing circuitry 248). It should be appreciated that, in such embodiments, one or more of the communication circuitry 242, the authentication circuitry 244, and/or the pairing circuitry 248 may form a portion of one or more of the processor 140, the I/O subsystem 142, the memory 144, the data storage 146, the communication subsystem 148, and/or other components of the authentication server 104. Additionally, in some embodiments, one or more of the illustrative modules may form a portion of another module and/or one or more of the illustrative modules may be independent of one another.

The communication module 242 is configured to receive, from the consumer device 102b, a request to redirect I/O to the provider device 102a. The request identifies the provider device 102a, for example by including a unique identifier of the provider device 102a. The communication module 242 is further configured to transmit a pairing identifier and an encryption key to the computing devices 102a, 102b and to command the provider device 102a to switch from a local message broker of the provider device 102a to the remote message broker 262 in response to authenticating the consumer device 102b. The communication module 242 may be configured to receive from the provider device 102a one or more message topics indicative of I/O devices 130 of the provider device 102a and transmit the message topics to the consumer device 102b in response to authenticating the consumer device 102b.

The authentication module 244 is configured to authenticate the consumer device 102b. Authenticating the consumer device 102b may include determining whether the consumer device 102b is authorized to redirect I/O to the provider device 102a. The authentication module 244 may be configured to access an authentication database 246 to authenticate the consumer device 102b.

The pairing module 248 is configured to generate a pairing identifier in response to authenticating the consumer device 102b. The pairing module 248 may be further configured to generate an encryption key in response to authenticating the consumer device 102b. In some embodiments, the pairing module 248 may be configured to query the provider device 102a for supported message topics in response to authenticating the consumer computing device 102b.

Still referring to FIG. 2, in the illustrative embodiment, the messaging server 106 establishes an environment 260 during operation. The illustrative embodiment 260 includes a message broker 262, which may be embodied as hardware, firmware, software, or a combination thereof. As such, in some embodiments, the message broker 262 may be embodied as circuitry or collection of electrical devices (e.g., message broker circuitry 262). It should be appreciated that, in such embodiments, the message broker circuitry 262 may form a portion of one or more of the processor, the I/O subsystem, the memory, the data storage, the communication subsystem, and/or other components of the messaging server 106.

The message broker 262 is configured to receive and forward messages between the computing devices 102a, 102b. The message broker 262 may implement any appropriate messaging transfer protocol. For example, in the illustrative embodiment, the message broker 262 implements the MQTT protocol. In other embodiments, the message broker 262 may implement other protocols such as CoAP, XMPP, REST, or other protocols.

Figure 3:
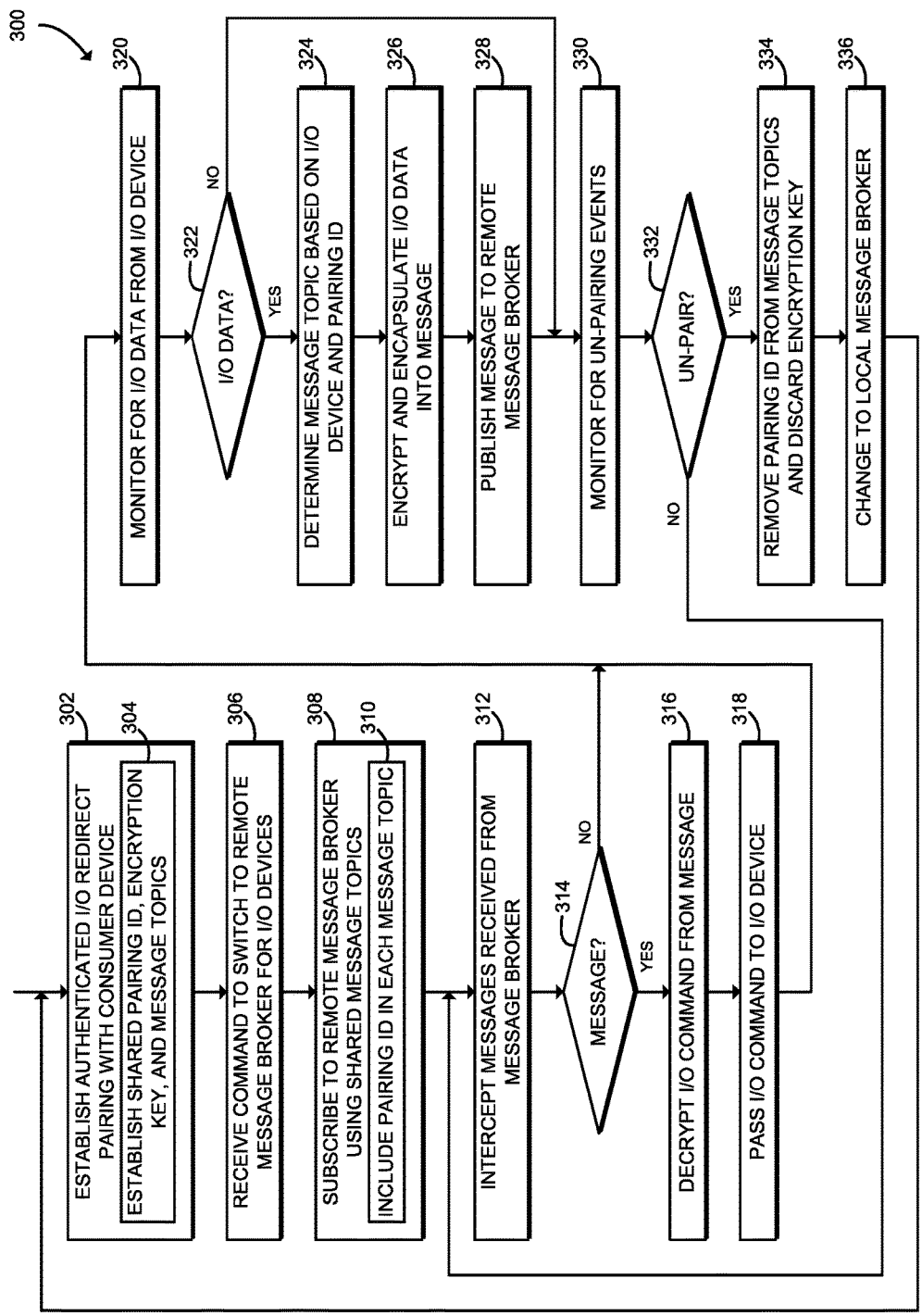
FIG. 3 is a simplified flow diagram of at least one embodiment of a method for inter-device I/O redirection that may be executed by a provider computing device of FIGS. 1 and 2.

Referring now to FIG. 3, in use, the provider device 102a may execute a method 300 for secure I/O redirection. The method 300 begins in block 302, in which the provider device 102a establishes an authenticated I/O redirect pairing with a consumer computing device 102b. As part of the I/O redirect pairing, in block 304 the provider device 102a and the consumer device 102b establish a shared pairing identifier, a shared secret encryption key, and one or more shared message topics. Each message topic corresponds to a particular I/O device 130 of the provider device 102a that may be accessed by the consumer device 102b. In some embodiments, the computing devices 102a, 102b may perform a handshake operation using a secure short-range data session as described below in connection with FIGS. 6-8. Additionally or alternatively, the computing devices 102a, 102b may perform a range-independent handshake operation as described below in connection with FIGS. 9-11. In some embodiments, the computing devices 102a, 102b may be manually configured with appropriate encryption keys, pairing identifiers, and message topics.

In block 306, the provider device 102a receives a command to switch from a local message broker to a remote message broker. For example, the provider device 102a may receive a command from the authentication server 104 to switch to a remote message broker 262 provided by the messaging server 106. The authentication server 104 may transmit the command to switch from a local message broker to a remote message broker after authenticating the consumer computing device 102b as described further below in connection with FIGS. 8 and 11.

Figure 4:
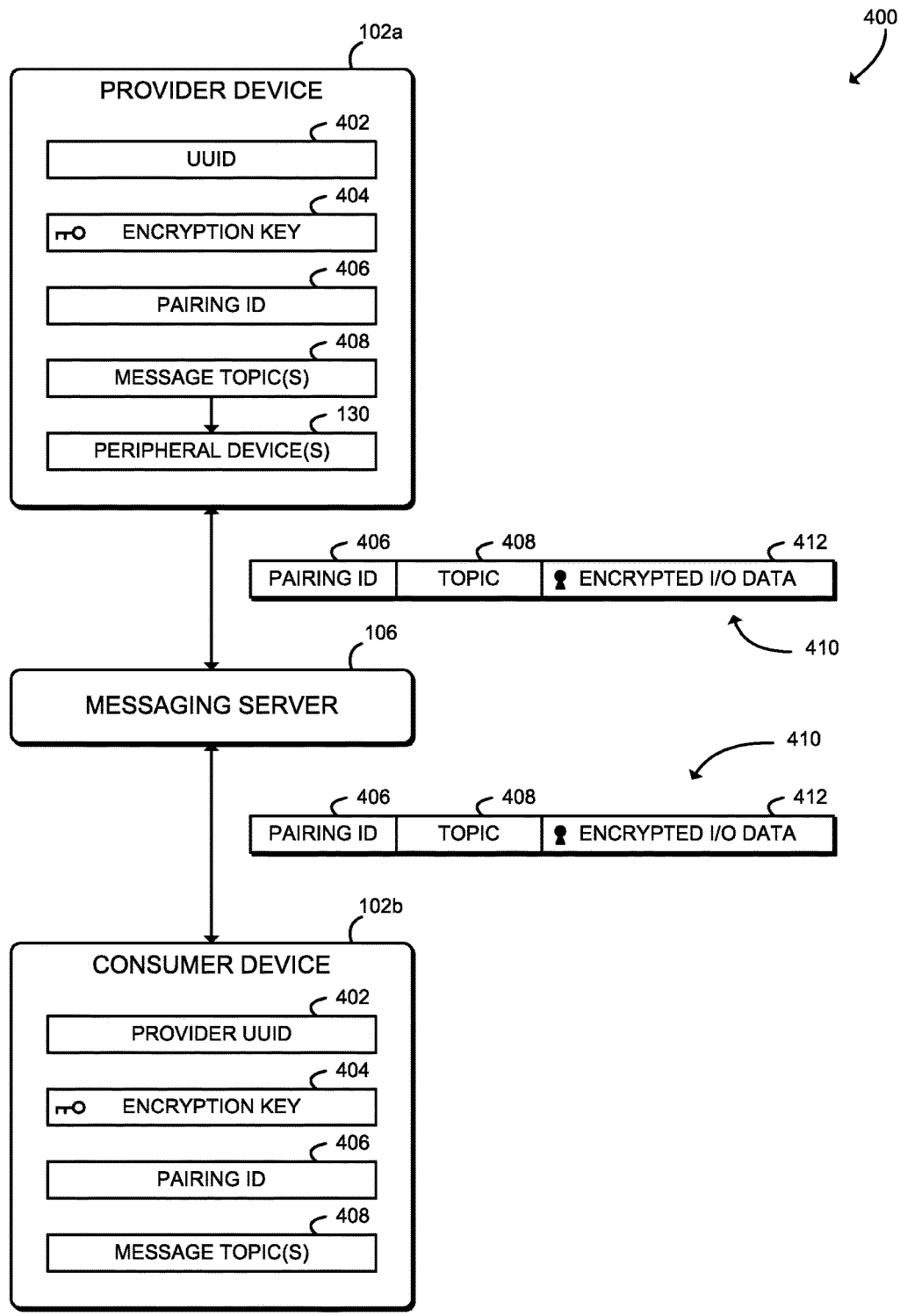
FIG. 4 is a schematic diagram illustrating an I/O redirect pairing that may be established by the system of FIGS. 1 and 2.

In block 308 the provider device 102a subscribes to a remote message broker 262 established by the messaging server 106 using the shared message topics. Each message topic is associated with a peripheral device 130 and/or associated device driver of the provider device 102a. Each message topic may also include other information, such as whether the topic represents input data generated by the peripheral device 130 (e.g., "IN") or output data transferred to the peripheral device 130 (e.g., "OUT"). The provider device 102a may subscribe as a listener, a publisher, or both a listener and a publisher of the shared message topics. In block 310, the provider device 102a includes the shared pairing identifier in each subscribed message topic. For example, the pairing identifier may be appended, prepended, or otherwise combined with the message topic. Referring now to FIG. 4, a schematic diagram 400 illustrates a secure I/O redirection pairing between the provider device 102a and the consumer device 102b. After establishing the pairing, the provider device 102a includes a universally unique identifier (UUID) 402, an encryption key 404, a pairing identifier 406, and one or more message topics 408. The consumer device 102b includes the same UUID 402, encryption key 404, a pairing identifier 406, and message topics 408. As shown, each message topic 408 is associated with a peripheral device 130 of the provider device 102a. Each message topic 408 may include a name, bus address, or other identifier of a peripheral device 130. For example, for a point-of-sale device 102a, the message topics 408 may include "printer," "cash drawer," "transaction dev," "scanner," or other identifier. The provider device 102a subscribes as a listener and/or a publisher for one or more topics using the pairing identifier 406 and message topic 408. For example, the provider device 102a may append, prepend, or otherwise combine the pairing identifier 406 with the message topic 408. The provider device 102a may subscribe to input and/or output for each peripheral device 130. Continuing that example, the provider device 102a may subscribe to the message topics "PAIRING_ID/printer/IN" as publisher and "PAIRING_ID/printer/OUT" as listener, to the message topics "PAIRING_ID/cash drawer/IN" as publisher and "PAIRING_ID/cash drawer/OUT" as listener, and so on.

Referring back to FIG. 3, in block 312 the provider device 102a may intercept one or more messages received from the remote message broker 262 of the messaging server 106. The messaging server 106 routes messages to the provider device 102a based on the registered message topics. In the illustrative embodiment, the messages are transmitted using the MQTT message transfer protocol. However, it should be understood that messages may be transmitted using any message transfer protocol, including CoAP, XMPP, REST, or other protocols. In block 314, the provider device 102a determines whether a message has been received. If not, the method 300 branches ahead to block 320, described below. If a message has been received, the method 300 advances to block 316.

In block 316, the provider device 102a decrypts the received message using the shared encryption key to recover unencrypted I/O data from the message. In the illustrative embodiment, the unencrypted I/O data is an I/O command generated by the consumer device 102b and intended to be output to the peripheral device 130 identified by the message topic of the received message. For example, the unencrypted I/O data may be embodied as a textual or other representation of an I/O function call with arguments, such as "ioctl (arg1, arg2, . . . )." It should be understood that the unencrypted I/O data may be embodied as any I/O command or other data received from the consumer device 102b that should be provided to the peripheral device 130.

Referring again to FIG. 4, the schematic diagram 400 illustrates one potential embodiment of messages that may be processed by the provider device 102a. As shown, one or more messages 410 may be exchanged between the provider device 102a and the consumer device 102b via the messaging server 106. Each message 410 includes the pairing identifier 406 and the message topic 408, as well as encrypted I/O data 412. As described above, the encrypted I/O data 412 received by the provider device 102a may include I/O commands or other data transmitted by the consumer device 102b and intended for the peripheral device 130 identified by the message topic 408 of the message 410. In some embodiments, the pairing identifier 406 and the message topic 408 may be combined in a single message topic field of the message 410. For example, in a message intended to be output to a printer device 130, the message topic may be embodied as "PAIRING_ID/printer/OUT," in a message intended to be output to a cash drawer device 130, the message topic may be embodied as "PAIRING_ID/cash drawer/OUT," and so on.

Referring back to FIG. 3, in block 318, the provider device 102a passes the unencrypted I/O command to the I/O device 130 identified by the message topic. The provider device 102a may pass the I/O command to the I/O device 130 using any appropriate technique, including piping the I/O command to an associated device driver, invoking a system call or function call, writing to one or more registers or memory-mapped I/O regions, or otherwise communicating with the I/O device 130. In some embodiments, the provider device 102a may pass the unencrypted I/O command to the I/O device 130 via a device driver, bus driver, filter driver, and/or other component of an I/O stack established by the provider device 102a. After passing the I/O command to the peripheral device 130, the method 300 advances to block 320.

In block 320, the provider device 102a monitors for I/O data produced by an I/O device 130. The I/O data may include, for example, I/O input data generated by the I/O device 130, I/O read completion data generated by the I/O device 130 in response to an I/O command, or other data generated by the I/O device 130. In some embodiments, the I/O data may be read or otherwise received from a device driver, bus driver, filter driver, and/or other component of an I/O stack established by the provider device 102a. In block 322, the provider device 102a determines whether I/O data has been generated. If not, the provider device 102a branches ahead to block 330, described below. If I/O data has been generated, the method 300 advances to block 324.

In block 324, the provider device 102a determines a message topic based on the I/O device 130 that generated the data and the pairing ID. As described above, the message topic may include a name or other identifier of the I/O device 130 as well as the pairing ID. The message topic may also indicate whether data is input data generated by the I/O device 130. For example, for a printer device 130, the message topic may be embodied as "PAIRING_ID/printer/IN," for a cash drawer device 130, the message topic may be embodied as "PAIRING_ID/cash drawer/IN," and so on.

In block 326, the provider device 102a encrypts the I/O data using the shared encryption key and encapsulates the encrypted I/O data in a message. The encapsulated message may include or otherwise identify the pairing identifier and message topic associated with the peripheral device 130 that generated the I/O data. In block 328, the provider device 102a publishes the message to the remote message broker 262 of the messaging server 106. As described above, in the illustrative embodiment, the message is transmitted using the MQTT message transfer protocol. However, it should be understood that messages may be transmitted using any message transfer protocol, including CoAP, XMPP, REST, or other protocols. As described further below, the messaging server 106 routes the message to the consumer device 102b. After transmitting the message, the method 300 advances to block 330.

In block 330, the provider device 102a monitors for un-pairing events. Un-pairing events may be embodied as any message, command, or other event indicating that the secure I/O redirection pairing with the consumer device 102b should be terminated. For example, the provider device 102a may receive a command or other message from the remote message broker 262 of the messaging server 106 to terminate the secure I/O redirection pairing. The messaging server 106 may transmit the command to terminate the pairing, for example, in response to receiving an un-pairing message or other event generated by the consumer device 102b, failing to detect a heartbeat signal from the consumer device 102b, or otherwise determining that a connection with the consumer device 102b has been lost. In block 332, the provider device 102a determines whether an un-pairing event has been detected. If not, the method 300 loops back to block 312 to continue intercepting messages from the messaging server 106 and monitoring for I/O device from the peripheral device 130. If an un-pairing event has been detected, the method 300 advances to block 334.

In block 334, the provider device 102a removes the pairing identifier from any message topics and discards the shared encryption key. After removing the pairing identifier, the message topic for each peripheral device 130 may include only a name or other local identifier of the peripheral device 130. The message topics may continue to include input/output indicators. For example, after removing the pairing identifier, the message topics may include "printer/IN, "printer/OUT," "cash drawer/IN," "cash drawer/OUT," and so on.

In block 336, the provider device 102a changes to a local message broker. The local message broker may route messages from one or more local applications or other message sources of the provider device 102a to the appropriate local peripheral devices 130 and/or local device drivers, bus drivers, filter drivers, or other components of an I/O stack. Thus, after terminating the pairing with the consumer device 102b, the provider device 102a may provide access to local I/O resources. Thus, in some embodiments, by using the local message broker, the provider device 102a may provide local applications seamless access to local I/O devices, irrespective of whether the provider device 102a is connected to a network. After switching to the local message broker, the method 300 loops back to block 302, in which the provider device 102a may establish additional secure I/O redirection pairings.

Figure 5:
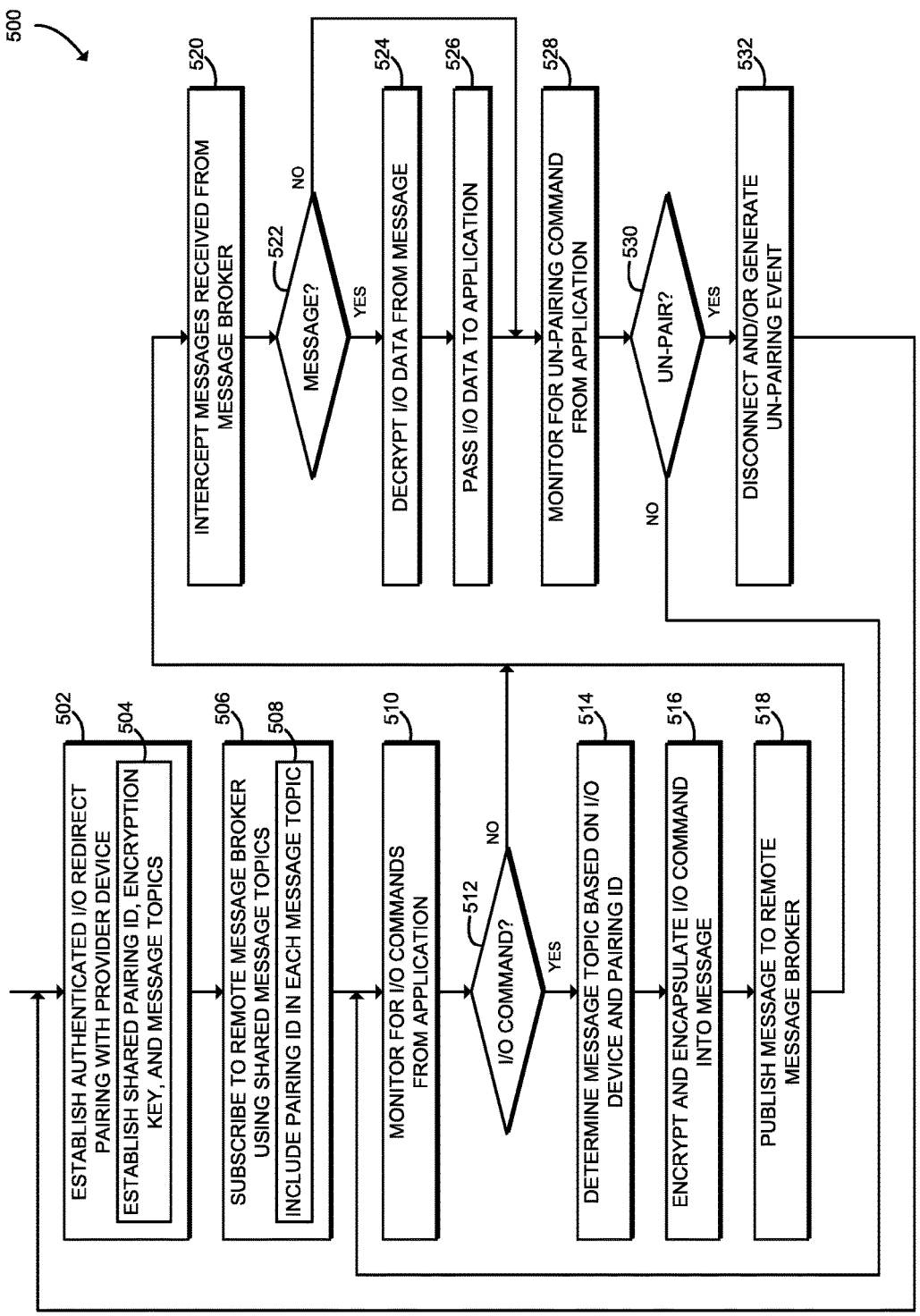
FIG. 5 is a simplified flow diagram of at least one embodiment of a method for inter-device I/O redirection that may be executed by a consumer computing device of FIGS. 1 and 2.

Referring now to FIG. 5, in use, the consumer device 102b may execute a method 500 for secure I/O redirection. The method 500 begins in block 502, in which the computing device 102b establishes an authenticated I/O redirect pairing with a provider computing device 102a. As part of the I/O redirect pairing, in block 504 the provider device 102a and the consumer device 102b establish a shared pairing identifier, a shared secret encryption key, and one or more shared message topics. Each message topic corresponds to a particular I/O device 130 of the provider device 102a that may be accessed by the consumer device 102b. In some embodiments, the computing devices 102a, 102b may perform a handshake operation using a secure short-range data session as described below in connection with FIGS. 6-8. Additionally or alternatively, the computing devices 102a, 102b may perform a range-independent handshake operation as described below in connection with FIGS. 9-11. In some embodiments, the computing devices 102a, 102b may be manually configured with appropriate encryption keys, pairing identifiers, and message topics.

In block 506 the consumer device 102b subscribes to the remote message broker 262 established by the messaging server 106 using the shared message topics. Each message topic is associated with a peripheral device 130 and/or associated device driver of the provider device 102a. Each message topic may also include other information, such as whether the topic represents input data generated by the peripheral device 130 (e.g., "IN") or output data transferred to the peripheral device 130 (e.g., "OUT"). The consumer device 102b may subscribe as a listener, as a publisher, or as both a listener and a publisher of the shared message topics. In block 508, the consumer device 102b includes the shared pairing identifier in each subscribed message topic. For example, the pairing identifier may be appended, prepended, or otherwise combined with the message topic. Continuing that example, the consumer device 102b may subscribe to the message topics "PAIRING_ID/printer/IN" as listener and "PAIRING_ID/printer/OUT" as publisher, to the message topics "PAIRING_ID/cash drawer/IN" as listener and "PAIRING_ID/cash drawer/OUT" as publisher, and so on.

In block 510, the consumer device 102b monitors for I/O commands generated by one or more applications 234 of the consumer device 102b. Each I/O command may be embodied as any system call, function call, memory-mapped I/O operation, or other command directed toward the peripheral device 130 of the provider device 102a. For example, an I/O command may be embodied as a textual or other representation of an I/O function call with arguments, such as "ioct1 (arg1, arg2, . . . )." Although illustrated as a function call, it should be understood that the I/O command may be embodied as any I/O data directed to the peripheral device 130 of the provider computing device 102a and/or any associated device driver. In block 512, the consumer device 102b determines whether an I/O command has been received. If not, the method 500 branches ahead to block 520, described below. If an I/O command has been received, the method 500 advances to block 514.

In block 514, the consumer device 102b determines a message topic based on the I/O device 130 identified by the I/O command as well as the pairing ID. As described above, the message topic may include a name or other identifier of the I/O device 130 as well as the pairing ID. The message topic may also indicate whether data is output data intended for the I/O device 130. For example, for a printer device 130, the message topic may be embodied as "PAIRING_ID/printer/OUT," for a cash drawer device 130, the message topic may be embodied as "PAIRING_ID/cash drawer/OUT," and so on.

In block 516, the consumer device 102b encrypts the I/O command using the shared encryption key and encapsulates the encrypted I/O command in a message. The encapsulated message may include or otherwise identify the pairing identifier and message topic associated with the peripheral device 130 identified by the I/O command. In block 518, the consumer device 102b publishes the message to the remote message broker 262 of the messaging server 106. As described above, in the illustrative embodiment, the message is transmitted using the MQTT message transfer protocol. However, it should be understood that messages may be transmitted using any message transfer protocol, including CoAP, XMPP, REST, or other protocols. As described above, the messaging server 106 routes the message to the provider device 102a. After transmitting the message, the method 500 advances to block 520.

In block 520, the consumer device 102b may intercept one or more messages received from the remote message broker 262 of the messaging server 106. The messaging server 106 routes messages to the consumer device 102b based on the registered message topics. In the illustrative embodiment, the messages are transmitted using the MQTT message transfer protocol. However, it should be understood that messages may be transmitted using any message transfer protocol, including CoAP, XMPP, REST, or other protocols. In block 522, the consumer device 102b determines whether a message has been received. If not, the method 500 branches ahead to block 528, described below. If a message has been received, the method 500 advances to block 524.

In block 524, the consumer device 102b decrypts the received message using the shared encryption key to recover unencrypted I/O data from the message. The unencrypted I/O data may include, for example, I/O input data generated by the associated I/O device 130 of the provider device 102a, I/O read completion data generated by the I/O device 130 of the provider device 102a in response to an I/O command, or other data generated by the I/O device 130 of the provider device 102a. As described above, in some embodiments the I/O data may be read or otherwise received from a device driver, bus driver, filter driver, and/or other component of an I/O stack established by the provider device 102a.

In block 526, the consumer device 102b passes the unencrypted I/O data to the application 234. The consumer device 102b may use any technique to pass the unencrypted I/O data. For example, the consumer device 102b may pass the unencrypted I/O data as return data from a function call or system call, as memory-mapped I/O data, using one or more callback functions, or using any other appropriate technique. In some embodiments, the consumer device 102b may pass the unencrypted I/O data via device driver, bus driver, filter driver, or other component of an I/O stack established by the consumer device 102b. After providing the I/O data to the application 234, the method 500 advances to block 528.

In block 528, the consumer device 102b monitors for un-pairing commands received from the application 234. Un-pairing commands may include commands to close a particular I/O device 130 and/or events such as application termination events, timeout events, or other events indicating that the secure I/O redirection pairing with the provider device 102a should be terminated. In block 530, the consumer device 102b determines whether an un-pairing command has been detected. If not, the method 500 loops back to block 510 to continue monitoring for I/O commands and intercepting messages from the messaging server 106. If an un-pairing command is detected, the method 500 advances to block 532.

In block 532, the consumer device 102b disconnects from the messaging server 106 or otherwise generates an un-pairing event to terminate the secure I/O redirect pairing. The consumer device 102b may, for example, transmit a message to the messaging server 106 indicating that the secure I/O redirect pairing should be terminated. As another example, the consumer device 102b may expressly close or otherwise terminate a communication session with the messaging server 106. As yet another example, in some embodiments the consumer device 102b may stop transmitting and/or responding to a heartbeat signal with the messaging server 106. After a certain period of inactivity, the messaging server 106 and/or the provider device 102a may determine that the secure I/O redirect pairing has been terminated. After terminating the pairing, the method 500 loops back to block 502, in which the consumer device 102b may establish additional secure I/O redirect pairings.

Figure 6:
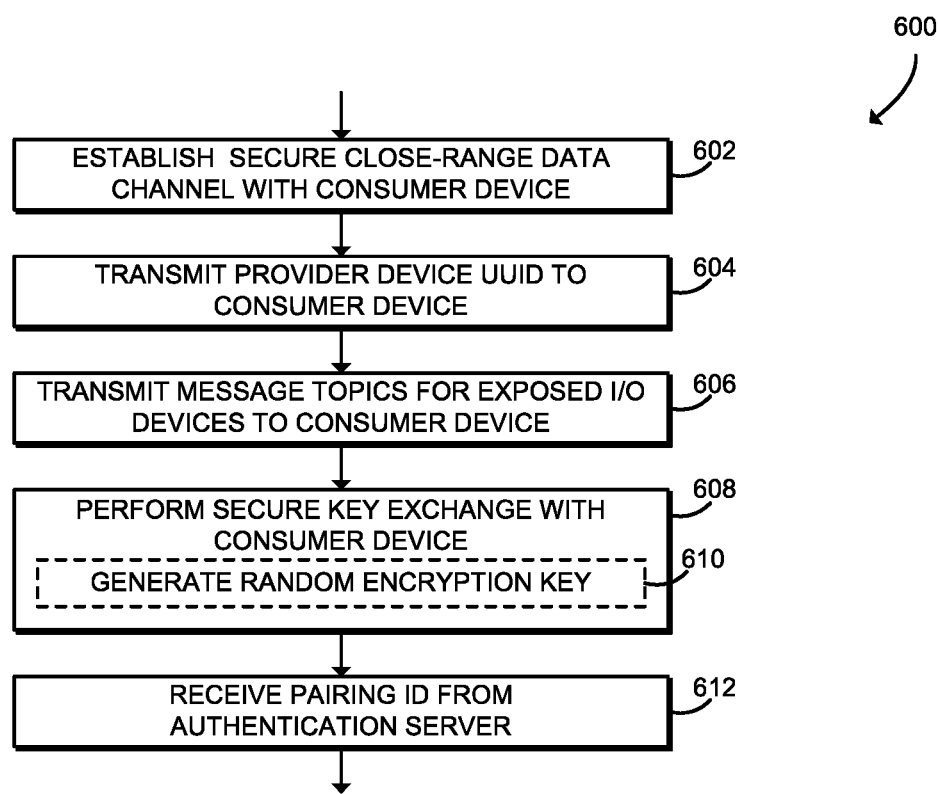
FIG. 6 is a simplified flow diagram of at least one embodiment of a method for short-range device pairing that may be executed by a provider computing device of FIGS. 1 and 2.

Referring now to FIG. 6, in use, the provider device 102a may execute a method 600 for short-range device pairing. The method 600 may be executed, for example, in connection with blocks 302, 304 of the method 300, as described above in connection with FIG. 3. The method 600 begins in block 602, in which the provider device 102a establishes a secure close-range data channel with a consumer computing device 102b. The computing devices 102a, 102b may establish the data channel using any short-range data communication technology and/or protocol. For example, the computing devices 102a, 102b may establish the data channel using near-field communication (NFC), low-power Bluetooth®, or other close-range wireless communication technology. In some embodiments, the computing devices 102a, 102b may establish the data channel using quick response (QR) codes, barcodes, or other visual communication technique. In addition to being limited to short range, the secure close-range data channel may be secured using encryption or other data protection techniques.

After establishing the secure close-range data channel, in block 604 the provider device 102a transmits a provider universally unique identifier (UUID) to the consumer device 102b. The UUID may be embodied as any number, alphanumeric code, or other value that uniquely identifies the provider device 102a.

In block 606, the provider device 102a transmits one or more message topics associated with peripheral devices 130 to the consumer device 102b. The provider device 102a transmits message topics for peripheral devices 130 that are exposed for potential secure I/O redirection to the consumer device 102b. In some embodiments, the provider device 102a may transmit message topics for less than all available peripheral devices 130; that is, the provider device 102a may selectively make the peripheral devices 130 available for secure I/O redirection. Each message topic may include a name or other identifier associated with available peripheral device 130. For example, for a point-of-sale device 102a, the message topics may include "printer," "cash drawer," "transaction dev," "scanner," or other identifier. The message topics transmitted to the consumer device 102b may not include a pairing identifier.

In block 608, the provider device 102a performs a secure key exchange with the consumer device 102b using the secure close-range data channel. After performing the secure key exchange, the provider device 102a locally stores an encryption key shared with the consumer device 102b. The encryption key is illustratively a 256-bit AES key; however, in other embodiments the encryption key may be embodied as any appropriate encryption key. In some embodiments, in block 610, the provider device 102a may randomly generate the encryption key. Additionally or alternatively, the encryption key may be generated by the consumer device 102b and then exchanged with the provider device 102a.

In block 612, the provider device 102a receives a pairing identifier from the authentication server 104. As described below in connection with FIGS. 7 and 8, the consumer device 102b authenticates with the authentication server 104, and after a successful authentication, the authentication server 104 provides the pairing identifier to the computing devices 102a, 102b. The pairing identifier may be embodied as any value shared between the computing devices 102a, 102b. In the illustrative embodiment, the pairing identifier is a 64-bit value randomly selected by the authentication server 104. As described above in connection with FIGS. 3 and 5, the pairing identifier may be included in message topics and used to route messages between the computing devices 102a, 102b using the messaging server 106. After receiving the pairing identifier, the secure I/O redirection pairing is established and the method 600 is completed.

Figure 7:
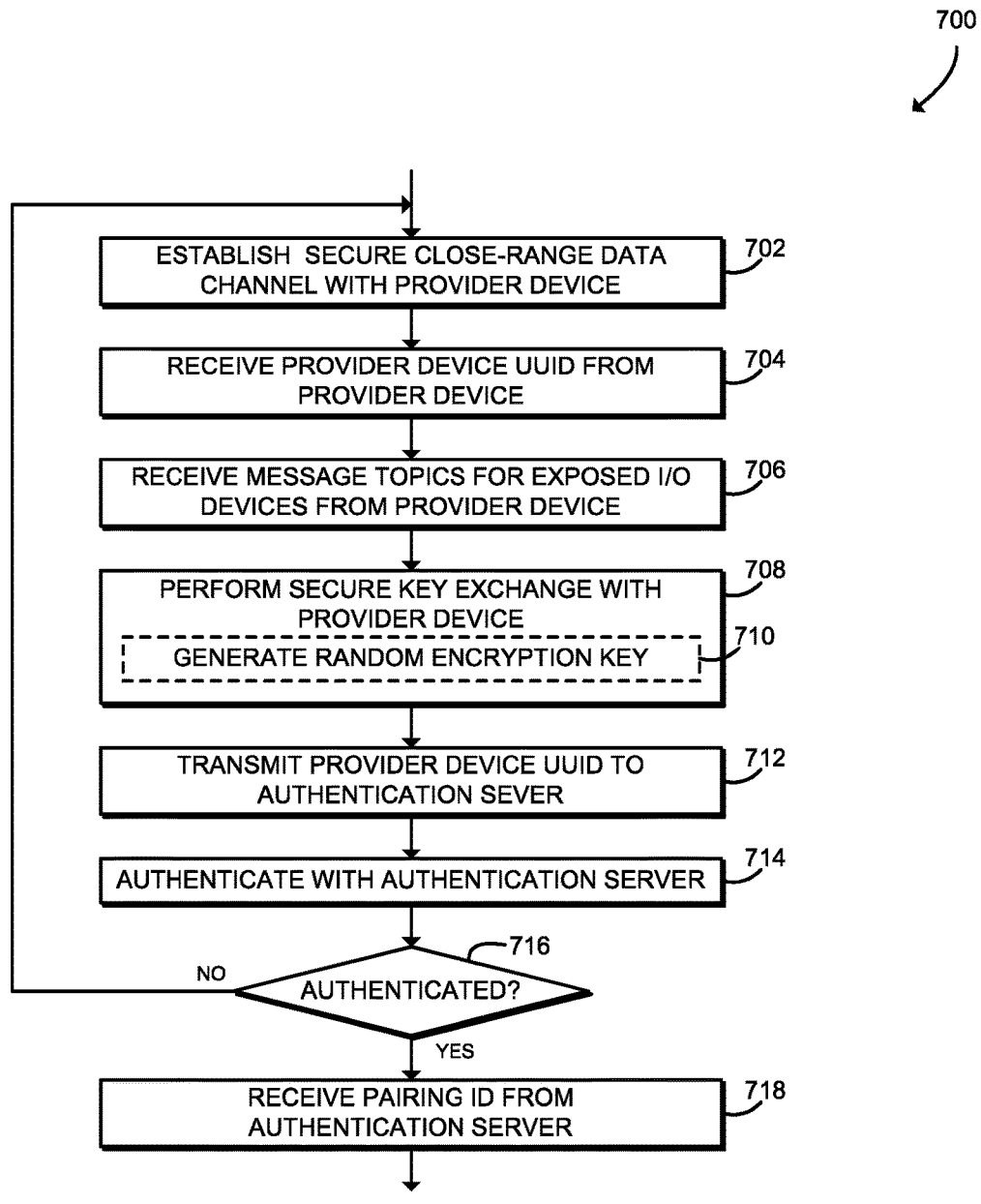
FIG. 7 is a simplified flow diagram of at least one embodiment of a method for short-range device pairing that may be executed by a consumer computing device of FIGS. 1 and 2.

Referring now to FIG. 7, in use, the consumer device 102b may execute a method 700 for short-range device pairing. The method 700 may be executed, for example, in connection with blocks 502, 504 of the method 500, as described above in connection with FIG. 5. The method 700 begins in block 702, in which the consumer device 102b establishes a secure close-range data channel with a provider computing device 102a. As described above, the computing devices 102a, 102b may establish the data channel using any short-range data communication technology and/or protocol. For example, the computing devices 102a, 102b may establish the data channel using near-field communication (NFC), low-power Bluetooth®, or other close-range wireless communication technology. In some embodiments, the computing devices 102a, 102b may establish the data channel using QR codes, barcodes, or other visual communication technique. In addition to being limited to short range, the secure close-range data channel may be secured using encryption or other data protection techniques.

After establishing the secure close-range data channel, in block 704 the consumer device 102b receives a provider universally unique identifier (UUID) from the provider device 102a. The UUID may be embodied as any number, alphanumeric code, or other value that uniquely identifies the provider device 102a.

In block 706, the consumer device 102b receives one or more message topics associated with peripheral devices 130 of the provider device 102a from the provider device 102a. The consumer device 102b receives message topics for peripheral devices 130 of the provider device 102a that are exposed for potential secure I/O redirection to the consumer device 102b. In some embodiments, the consumer device 102b may receive message topics for less than all available peripheral devices 130 of the provider device 102a; that is, the provider device 102a may selectively make the peripheral devices 130 available for secure I/O redirection. Each message topic may include a name or other identifier associated with available peripheral device 130 of the provider device 102a. For example, for a point-of-sale device 102a, the message topics may include "printer," "cash drawer," "transaction dev," "scanner," or other identifier. The message topics received by the consumer device 102b may not include a pairing identifier.

In block 708, the consumer device 102b performs a secure key exchange with the provider device 102a using the secure close-range data channel. After performing the secure key exchange, the consumer device 102b locally stores an encryption key shared with the provider device 102a. The encryption key is illustratively a 256-bit AES key; however, in other embodiments the encryption key may be embodied as any appropriate encryption key. In some embodiments, in block 710, the consumer device 102b may randomly generate the encryption key. Additionally or alternatively, the encryption key may be generated by the provider device 102a and then exchanged with the consumer device 102b.

In block 712, the consumer device 102b transmits the UUID of the provider device 102a to the authentication server 104. The provider device 102a UUID may be included in, for example, a request to the authentication server 104 to access peripheral devices 130 of the provider computing device 102a. In block 714, the consumer device 102b authenticates with the authentication server 104. As described further below in connection with FIG. 8, the authentication server 104 may, for example, verify the authenticity of the consumer device 102b, verify a user operating the consumer device 102b, verify that the consumer device 102b is permitted to access peripheral devices 130 of the provider device 102a, or otherwise verify the consumer device 102b and/or user of the consumer device 102b. In block 716, the consumer device 102b determines whether it has successfully authenticated with the authentication server 104. If not, the method 700 loops back to block 702, in which the consumer device 102b may repeat the attempt to establish the secure I/O redirection pairing. If authentication is successful, the method 700 proceeds to block 718.

In block 718, the consumer device 102b receives a pairing identifier from the authentication server 104. As described above, the pairing identifier may be embodied as any value shared between the computing devices 102a, 102b. In the illustrative embodiment, the pairing identifier is a 64-bit value randomly selected by the authentication server 104. After receiving the pairing identifier, the secure I/O redirection pairing is established and the method 700 is completed. As described above in connection with FIGS. 3 and 5, the pairing identifier may be included in message topics and used to route messages between the computing devices 102a, 102b using the messaging server 106. The content of the messages is encrypted using the shared encryption key.

Figure 8:
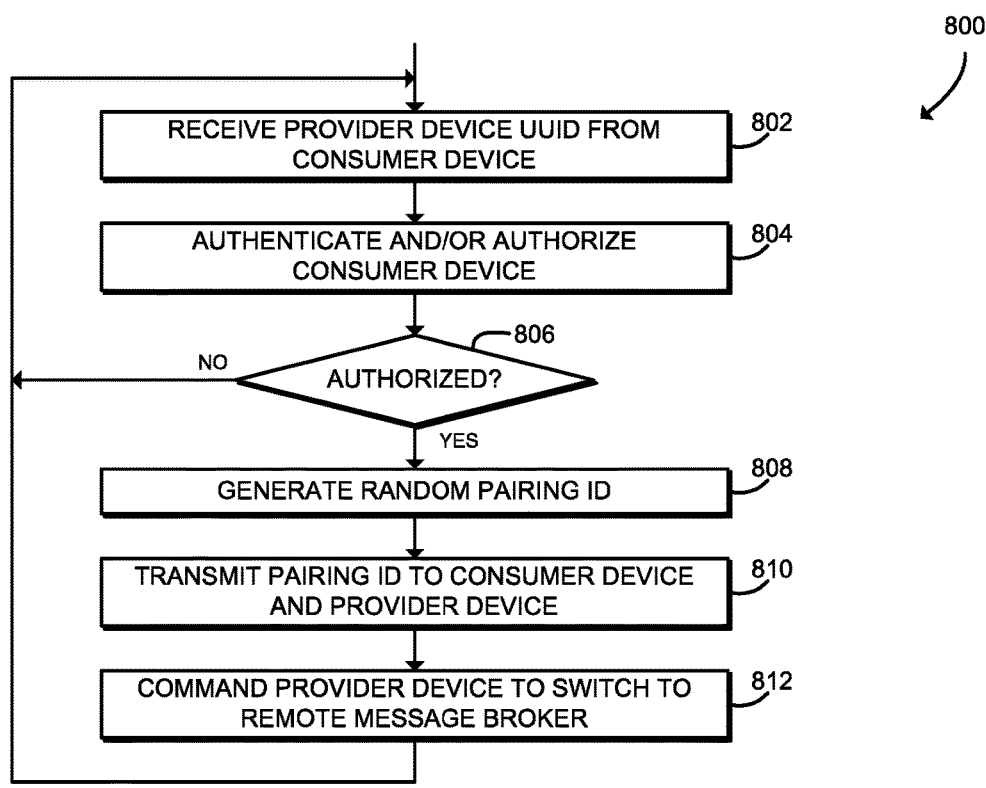
FIG. 8 is a simplified flow diagram of at least one embodiment of a method for device authentication that may be executed by an authentication server of FIGS. 1 and 2.

Referring now to FIG. 8, in use, the authentication server 104 may execute a method 800 for device authentication. The method 800 begins in block 802, in which the authentication server 104 receives, from a consumer device 102b, a universally unique identifier (UUID) of a provider device 102a. For example, the authentication server 104 may receive the provider device 102a UUID as part of a request from the consumer device 102b to access peripheral devices 130 of the provider device 102a. The authentication server 104 may check the availability of the producer device 102a on the network. If an un-recognized UUID is received or if the producer device 102a is not available or not connected to the network, then the authentication server 104 may return an error message to the consumer device 102b. If so, the method 800 may loop back to block 802.

In block 804, the authentication server 104 authenticates and/or authorizes the consumer device 102b. The authentication server 104 determines whether the consumer device 102b is permitted to redirect I/O to the provider device 102a. The authentication server 104 may, for example, access the authentication database 246 to determine whether the consumer device 102b is permitted to access the peripheral devices 130 of the provider device 102a or otherwise establish a secure I/O redirect session with the provider device 102a. The authentication server 104 may also, for example, verify the authenticity of the consumer device 102b, verify user credentials, verify user biometric information, or otherwise verify the consumer device 102b and/or user of the consumer device 102b. In block 806, the authentication server 104 checks whether the consumer device 102b is authorized to redirect I/O to the provider device 102a. If not, the method 800 loops back to block 802, in which the authentication server 104 may receive further requests to authenticate consumer devices 102b. If I/O redirection is permitted, the method 800 advances to block 808.

In block 808, the authentication server 104 generates a random pairing identifier for the computing devices 102a, 102b. In the illustrative embodiment, the pairing identifier is a 64-bit value; however, the pairing identifier may be embodied as any value shared between the computing devices 102a, 102b. In block 810, the authentication server transmits the pairing identifier to the consumer device 102b and the provider device 102a. In block 812, the authentication server 104 commands the provider device 102a to switch from a local message broker to the remote message broker 262 established by the messaging server 106. As described above in connection with FIGS. 3 and 5, after switching to the remote message broker 262, the computing devices 102a, 102b may exchange secure messages to redirect I/O associated with one or more peripheral devices 130 of the provider device 102a. After commanding the provider device 102a to switch to the remote message broker 262, the method 800 loops back to block 802, in which the authentication server 104 may authenticate additional consumer devices 102b.

Figure 9:
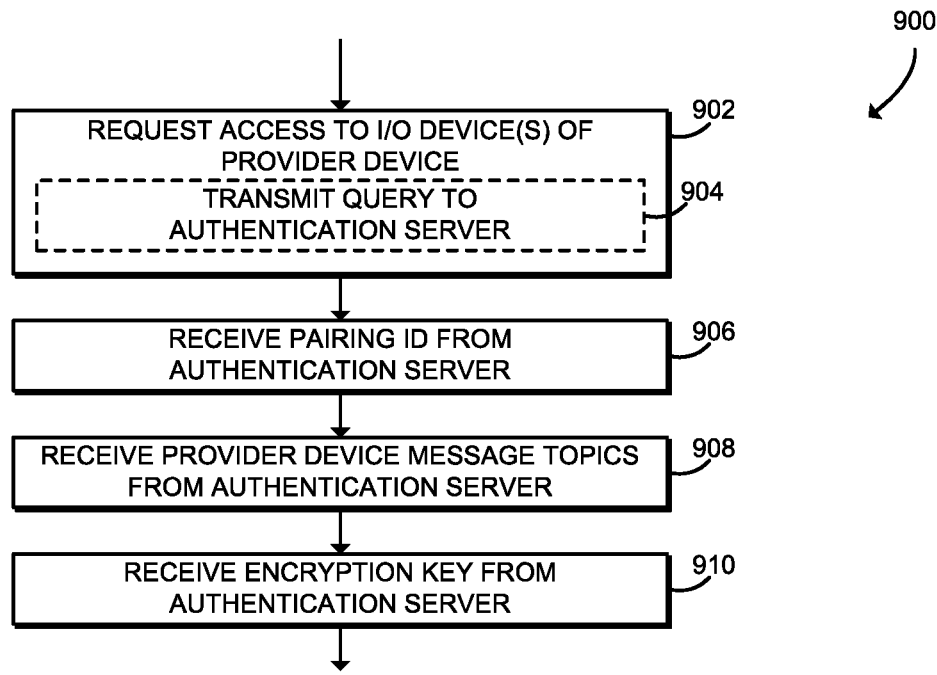
FIG. 9 is a simplified flow diagram of at least one embodiment of a method for device pairing that may be executed by a consumer computing device of FIGS. 1 and 2.

Referring now to FIG. 9, in use, the consumer device 102b may execute a method 900 for range-independent device pairing. The method 900 may be executed, for example, in connection with blocks 502, 504 of the method 500, as described above in connection with FIG. 5. The method 900 begins in block 902, in which the consumer device 102b requests access to one or more I/O devices 130 of the provider device 102a. In block 904, the consumer device 102b transmits a query to the authentication server 104. The query may identify the provider device 102a, for example by including an identifier of the provider device 102a such as a device identifier, universally unique identifier (UUID), domain name, or other identifier. As described below in connection with FIG. 11, in response to receiving the request, the authentication server 104 authenticates and otherwise determines whether the consumer device 102b is permitted to redirect I/O to the provider device 102a.

In block 906, the consumer device 102b receives a pairing identifier from the authentication server 104. The pairing identifier may be embodied as any value shared between the computing devices 102a, 102b. In the illustrative embodiment, the pairing identifier is a 64-bit value randomly selected by the authentication server 104. As described above in connection with FIGS. 3 and 5, the pairing identifier may be included in message topics and used to route messages between the computing devices 102a, 102b using the messaging server 106.

In block 908, the consumer device 102b receives one or more message topics associated with peripheral devices 130 of the provider device 102a from the authentication server 104. The consumer device 102b receives message topics for peripheral devices 130 of the provider device 102a that are exposed for potential secure I/O redirection to the consumer device 102b. In some embodiments, the consumer device 102b may receive message topics for less than all available peripheral devices 130 of the provider device 102a; that is, the provider device 102a may selectively make the peripheral devices 130 available for secure I/O redirection. Each message topic may include a name or other identifier associated with available peripheral device 130 of the provider device 102a. For example, for a point-of-sale device 102a, the message topics may include "printer," "cash drawer," "transaction dev," "scanner," or other identifier. Instead of receiving the pairing identifier separately as described above in connection with block 906, in some embodiments the message topics received by the consumer device 102b from the authentication server 104 may include the pairing identifier.

In block 910, the consumer device 102b receives an encryption key from the authentication server 104. After receipt, the consumer device 102b locally stores the encryption key. As described further below in connection with FIGS. 10 and 11, the encryption key is randomly generated by the authentication server 104 and shared with the provider device 102a. The encryption key is illustratively a 256-bit AES key; however, in other embodiments the encryption key may be embodied as any appropriate encryption key. After receiving the encryption key, the secure I/O redirection pairing is established and the method 900 is completed. As described above in connection with FIGS. 3 and 5, the pairing identifier may be included in message topics and used to route messages between the computing devices 102a, 102b using the messaging server 106. The content of the messages is encrypted using the shared encryption key.

Figure 10:
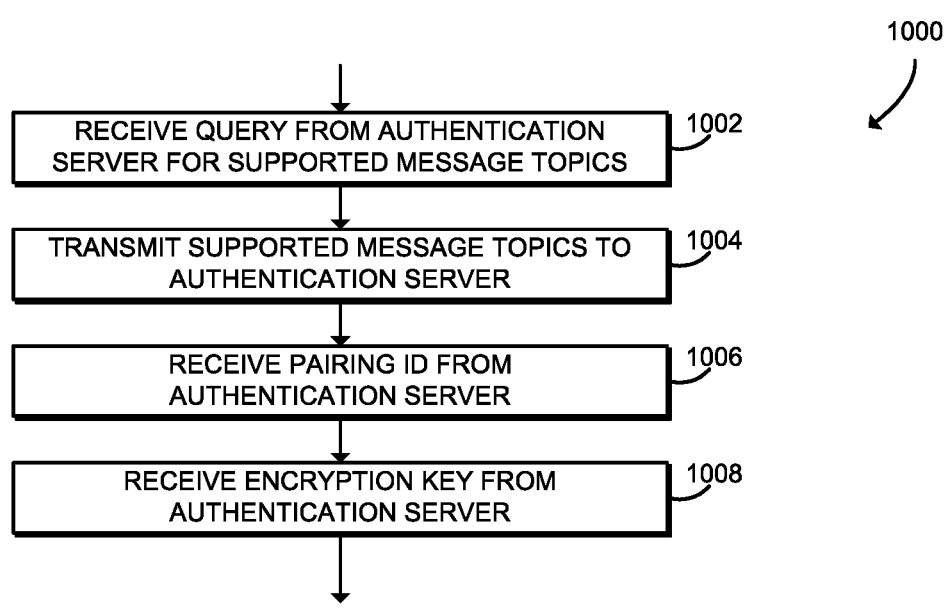
FIG. 10 is a simplified flow diagram of at least one embodiment of a method for device pairing that may be executed by a provider computing device of FIGS. 1 and 2.

Referring now to FIG. 10, in use, the provider device 102a may execute a method 1000 for range-independent device pairing. The method 1000 may be executed, for example, in connection with blocks 302, 304 of the method 300, as described above in connection with FIG. 3. The method 1000 begins in block 1002, in which the provider device 102a receives a query from the authentication server 104 for supported message topics associated with the peripheral devices 130. As described further below in connection with FIG. 11, the authentication server 104 may query the provider device 102a for supported message topics after receiving a request from the consumer device 102b to access the peripheral devices 130 of the provider device 102a.

In block 1004, the provider device 102a transmits one or more message topics associated with peripheral devices 130 to the authentication server 104. The provider device 102a transmits message topics for peripheral devices 130 that are exposed for potential secure I/O redirection to the consumer device 102b. In some embodiments, the provider device 102a may transmit message topics for less than all available peripheral devices 130; that is, the provider device 102a may selectively make the peripheral devices 130 available for secure I/O redirection. Each message topic may include a name or other identifier associated with available peripheral device 130. For example, for a point-of-sale device 102a, the message topics may include "printer," "cash drawer," "transaction dev," "scanner," or other identifier. The message topics transmitted to the authentication server 104 may not include a pairing identifier.

In block 1006, the provider device 102a receives a pairing identifier from the authentication server 104. The pairing identifier may be embodied as any value shared between the computing devices 102a, 102b. In the illustrative embodiment, the pairing identifier is a 64-bit value randomly selected by the authentication server 104. As described above in connection with FIGS. 3 and 5, the pairing identifier may be included in message topics and used to route messages between the computing devices 102a, 102b using the messaging server 106.

In block 1008, the provider device 102a receives an encryption key from the authentication server 104. After receipt, the provider device 102a locally stores the encryption key. As described further in connection with FIGS. 9 and 11, the encryption key is randomly generated by the authentication server 104 and shared with the consumer device 102b. The encryption key is illustratively a 256-bit AES key; however, in other embodiments the encryption key may be embodied as any appropriate encryption key. After receiving the encryption key, the secure I/O redirection pairing is established and the method 1000 is completed. As described above in connection with FIGS. 3 and 5, the pairing identifier may be included in message topics and used to route messages between the computing devices 102a, 102b using the messaging server 106. The content of the messages is encrypted using the shared encryption key.

Figure 11:
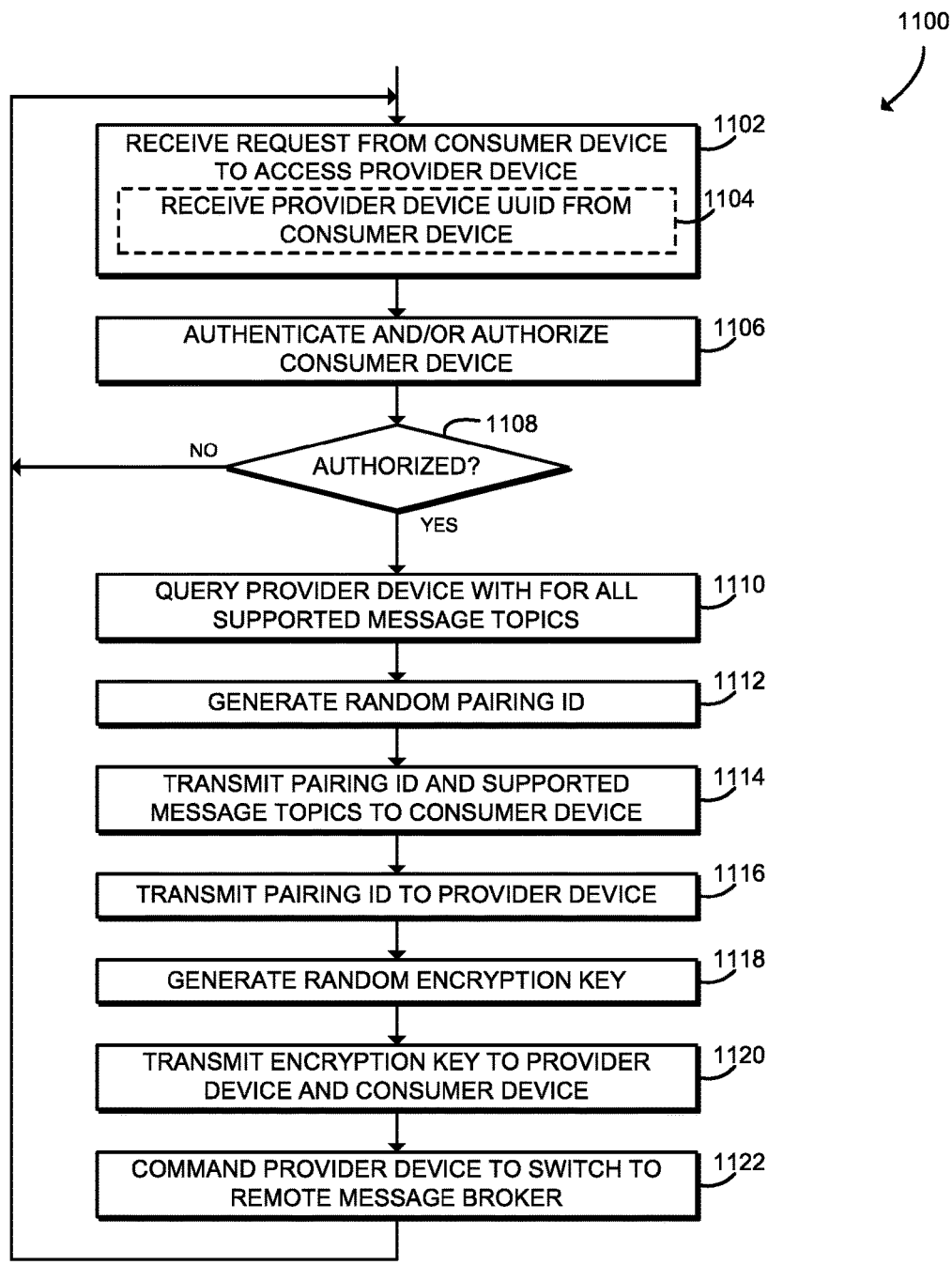
FIG. 11 is a simplified flow diagram of at least one embodiment of a method for device authentication that may be executed by the authentication server of FIGS. 1 and 2.

Referring now to FIG. 11, in use, the authentication server 104 may execute a method 1100 for device authentication. The method 1100 begins in block 1102, in which the authentication server 104 receives, from a consumer device 102b, a request to access one or more I/O devices 130 of a provider device 102a. In some embodiments, in block 1104, the authentication server 104 may receive a query from the consumer device 102b that includes the universally unique identifier (UUID) of the provider device 102a.

In block 1106, the authentication server 104 authenticates the consumer device 102b. The authentication server 104 may determine whether the consumer device 102b is permitted to redirect I/O to the provider device 102a. The authentication server 104 may, for example, access the authentication database 246 to determine whether the consumer device 102b is permitted to access the peripheral devices 130 of the provider device 102a or otherwise establish a secure I/O redirect session with the provider device 102a. Additionally or alternatively, the authentication server 104 may verify the authenticity of the consumer device 102b, verify user credentials, verify user biometric information, or otherwise verify the consumer device 102b and/or user of the consumer device 102b. In block 1108, the authentication server 104 checks whether the consumer device 102b is authorized to redirect I/O to the provider device 102a. If not, the method 1100 loops back to block 1102, in which the authentication server 104 may receive further requests to establish secure I/O redirection pairings. If I/O redirection is permitted, the method 1000 advances to block 1110.

In block 1110, the authentication server 104 queries the provider device 102a for supported message topics associated with peripheral devices 130 of the provider device 102a. As described above in connection with FIG. 10, the authentication server 104 may transmit a query to the provider device 102a, and the provider device 102a may respond with one or more message topics associated with peripheral devices 130. The provider device 102a transmits message topics for peripheral devices 130 that are exposed for potential secure I/O redirection to the consumer device 102b. In some embodiments, the provider device 102a may transmit message topics for less than all available peripheral devices 130; that is, the provider device 102a may selectively make the peripheral devices 130 available for secure I/O redirection. Each message topic may include a name or other identifier associated with available peripheral device 130. For example, for a point-of-sale device 102a, the message topics may include "printer," "cash drawer," "transaction dev," "scanner," or other identifier. The message topics transmitted from the provider device 102a may not include a pairing identifier.

In block 1112, the authentication server 104 generates a random pairing identifier for the computing devices 102a, 102b. In the illustrative embodiment, the pairing identifier is a 64-bit value; however, the pairing identifier may be embodied as any value shared between the computing devices 102a, 102b. As described above in connection with FIGS. 3 and 5, the pairing identifier may be included in message topics and used to route messages between the computing devices 102a, 102b using the messaging server 106. In block 1114, the authentication server 104 transmits the pairing identifier and the supported message topics to the consumer device 102b. In block 1116, the authentication server transmits the pairing identifier to the provider device 102a.

In block 1118, the authentication server 104 generates a random encryption key. The encryption key is illustratively a 256-bit AES key; however, in other embodiments the encryption key may be embodied as any appropriate encryption key. In block 1120, the authentication server 104 transmits the encryption key to the provider device 102a and the consumer device 102b. As described above in connection with FIGS. 3 and 5, the encryption key may be used to protect messages exchanged by the computing devices 102a, 102b using the messaging server 106.

In block 1122, the authentication server 104 commands the provider device 102a to switch from a local message broker to the remote message broker established by the messaging server 106. As described above in connection with FIGS. 3 and 5, after switching to the remote message broker 262, the computing devices 102a, 102b may exchange secure messages to redirect I/O associated with one or more peripheral devices 130 of the provider device 102*a*. After commanding the provider device 102*a* to switch to the remote message broker 262, the method 1100 loops back to block 1102, in which the authentication server 104 may receive further requests to establish secure I/O redirection pairings.

It should be appreciated that, in some embodiments, any one or more of the methods 300, 500, 600, 700, 900, and/or 1000 may be embodied as various instructions stored on a computer-readable media, which may be executed by the processor 120, a peripheral device 130, and/or other components of a computing device 102 to cause the computing device 102 to perform the corresponding method 300, 500, 600, 700, 900, and/or 1000. The computer-readable media may be embodied as any type of media capable of being read by the computing device 102 including, but not limited to, the memory 124, the data storage 126, a local memory of the processor 120, other memory or data storage devices of the computing device 102, portable media readable by a peripheral device 130 of the computing device 102, and/or other media.

Similarly, it should be appreciated that, in some embodiments, any one or more of the methods 800 and/or 1100 may be embodied as various instructions stored on a computer-readable media, which may be executed by the processor 140, a peripheral device 150, and/or other components of authentication server 104 to cause the authentication server 104 to perform the corresponding method 800 and/or 1100. The computer-readable media may be embodied as any type of media capable of being read by the authentication server 104 including, but not limited to, the memory 144, the data storage 146, a local memory of the processor 140, other memory or data storage devices of the authentication server 104, portable media readable by a peripheral device 150 of the authentication server 104, remote storage media accessible by a computing device 102 or the authentication server 104 through a network 108, and/or other media.

EXAMPLES

Illustrative examples of the technologies disclosed herein are provided below. An embodiment of the technologies may include any one or more, and any combination of, the examples described below.

Example 1 includes a computing device for secure I/O redirection, the computing device comprising a processor; and one or more memory devices having stored therein a plurality of instructions that, when executed by the processor, cause the computing device to: establish an authenticated I/O redirect pairing with a second computing device, wherein the I/O redirect pairing is associated with a shared pairing identifier, a shared encryption key, and a shared message topic; subscribe to a remote message broker using the shared message topic, wherein the message topic is indicative of the pairing identifier and an I/O device; intercept a message received from the remote message broker, wherein the message corresponds to the message topic; and decrypt the message using the encryption key to generate I/O data.

Example 2 includes the subject matter of Example 1, and wherein the computing device comprises the I/O device; and the plurality of instructions, when executed by the processor, further cause the computing device to provide the I/O data to the I/O device, wherein the I/O data comprises an I/O command.

Example 3 includes the subject matter of any of Examples 1 and 2, and wherein the plurality of instructions, when executed by the processor, further cause the computing device to capture I/O data generated by the I/O device; encrypt the I/O data to generate encrypted I/O data using the encryption key; encapsulate the encrypted I/O data into a message corresponding to the shared message topic; and publish the message to the remote message broker.

Example 4 includes the subject matter of any of Examples 1-3, and wherein the plurality of instructions, when executed by the processor, further cause the computing device to switch from a local message broker of the computing device to the remote message broker in response to establishment of the authenticated I/O redirect pairing.

Example 5 includes the subject matter of any of Examples 1-4, and wherein the plurality of instructions, when executed by the processor, further cause the computing device to unsubscribe from the remote message broker in response to an un-pairing event associated with the authenticated I/O redirect pairing; remove the pairing identifier from the message topic to generate a message topic indicative of the I/O device in response to the un-pairing event; and subscribe to a local message broker for the message topic indicative of the I/O device.

Example 6 includes the subject matter of any of Examples 1-5, and wherein to establish the authenticated I/O redirect pairing with the second computing device comprises to establish a secure close-range data channel with the second computing device; transmit a unique identifier of the computing device to the second computing device via the secure close-range data channel; transmit the message topic to the second computing device via the secure close-range data channel; perform a secure key exchange to exchange the encryption key with the second computing device via the secure close-range data channel; and receive the pairing identifier in response to transmission of the unique identifier to the second computing device.

Example 7 includes the subject matter of any of Examples 1-6, and wherein the secure close-range data channel comprises a personal area network connection or a near-field communication connection.

Example 8 includes the subject matter of any of Examples 1-7, and wherein the plurality of instructions, when executed by the processor, further cause the computing device to generate the encryption key; and to perform the secure key exchange comprises to perform the secure key exchange in response to generation of the encryption key.

Example 9 includes the subject matter of any of Examples 1-8, and wherein to receive the pairing identifier comprises to receive the pairing identifier from an authentication server.

Example 10 includes the subject matter of any of Examples 1-9, and wherein to establish the authenticated I/O redirect pairing with the second computing device comprises to receive a query for supported message topics from an authentication server; transmit the message topic to the authentication server in response to receipt of the query for supported message topics; receive the encryption key from the authentication server; and receive the pairing identifier from the authentication server.

Example 11 includes the subject matter of any of Examples 1-10, and wherein the plurality of instructions, when executed by the processor, further cause the computing device to provide the I/O data to an application of the computing device, wherein the I/O data is generated by the I/O device, and wherein the second computing device comprises the I/O device.

Example 12 includes the subject matter of any of Examples 1-11, and wherein the plurality of instructions, when executed by the processor, further cause the computing device to capture an I/O command generated by the application; encrypt the I/O command to generate an encrypted I/O command with the encryption key; encapsulate the encrypted I/O command into a message that corresponds to the shared message topic; and publish the message to the remote message broker.

Example 13 includes the subject matter of any of Examples 1-12, and wherein the plurality of instructions, when executed by the processor, further cause the computing device to generate an un-pairing event associated with the authenticated I/O redirect pairing.

Example 14 includes the subject matter of any of Examples 1-13, and wherein to establish the authenticated I/O redirect pairing with the second computing device comprises to establish a secure close-range data channel with the second computing device; receive a unique identifier of the second computing device from the second computing device via the secure close-range data channel; receive the message topic from the second computing device via the secure close-range data channel; perform a secure key exchange to exchange the encryption key with the second computing device via the secure close-range data channel authenticate the computing device with an authentication server in response to receipt of the unique identifier of the second computing device; and receive the pairing identifier from the authentication server in response to authentication of the computing device.

Example 15 includes the subject matter of any of Examples 1-14, and wherein the secure close-range data channel comprises a personal area network connection or a near-field communication connection.

Example 16 includes the subject matter of any of Examples 1-15, and wherein to authenticate the computing device with the authentication server comprises to transmit the unique identifier of the second computing device to the authentication server.

Example 17 includes the subject matter of any of Examples 1-16, and wherein the plurality of instructions, when executed by the processor, further cause the computing device to generate the encryption key; and to perform the secure key exchange comprises to perform the secure key exchange in response to generation of the encryption key.

Example 18 includes the subject matter of any of Examples 1-17, and wherein to establish the authenticated I/O redirect pairing with the second computing device comprises to transmit a request to access I/O devices of the second computing device to the authentication server, wherein the request identifies the second computing device; and receive the pairing identifier, the encryption key, and the message topic from the authentication server in response to transmission of the request.

Example 19 includes a computing device for establishing a secure I/O redirection pairing, the computing device comprising a processor; and one or more memory devices having stored therein a plurality of instructions that, when executed by the processor, cause the computing device to receive, from a consumer computing device, a request to redirect I/O to a provider computing device, wherein the request identifies the provider computing device; authenticate the consumer computing device in response to receipt of the request; generate a pairing identifier in response to authentication of the consumer computing device; and transmit the pairing identifier to the consumer computing device and the provider computing device.

Example 20 includes the subject matter of Example 19, and wherein to authenticate the consumer computing device comprises to determine whether the consumer computing device is authorized to redirect I/O to the provider computing device.

Example 21 includes the subject matter of any of Examples 19 and 20, and wherein the plurality of instructions, when executed by the processor, further cause the computing device to command the provider computing device to switch from a local message broker of the provider computing device to a remote message broker in response to the authentication of the consumer computing device.

Example 22 includes the subject matter of any of Examples 19-21, and wherein the request comprises a unique device identifier of the provider computing device.

Example 23 includes the subject matter of any of Examples 19-22, and wherein the request comprises a domain name of the provider computing device.

Example 24 includes the subject matter of any of Examples 19-23, and wherein the plurality of instructions, when executed by the processor, further cause the computing device to generate an encryption key in response to the authentication of the consumer computing device; and transmit the encryption key to the consumer computing device and the provider computing device.

Example 25 includes the subject matter of any of Examples 19-24, and wherein the plurality of instructions, when executed by the processor, further cause the computing device to receive a message topic from the provider device, wherein the message topic is indicative of an I/O device of the provider computing device; and transmit the message topic to the consumer computing device in response to the authentication of the consumer computing device.

Example 26 includes the subject matter of any of Examples 19-25, and wherein the plurality of instructions, when executed by the processor, further cause the computing device to query the provider computing device for supported message topics in response to the authentication of the consumer computing device; and to receive the message topic from the provider device comprises to receive the message topic from the provider device in response to a query of the provider computing device for the supported message topics.

Example 27 includes a method for secure I/O redirection, the method comprising establishing, by a computing device, an authenticated I/O redirect pairing with a second computing device, wherein the I/O redirect pairing is associated with a shared pairing identifier, a shared encryption key, and a shared message topic; subscribing, by the computing device, to a remote message broker using the shared message topic, wherein the message topic is indicative of the pairing identifier and an I/O device; intercepting, by the computing device, a message received from the remote message broker, wherein the message corresponds to the message topic; and decrypting, by the computing device, the message using the encryption key to generate I/O data.

Example 28 includes the subject matter of Example 27, and further comprising providing, by the computing device, the I/O data to the I/O device, wherein the I/O data comprises an I/O command and wherein the computing device includes the I/O device.

Example 29 includes the subject matter of any of Examples 27 and 28, and further comprising capturing, by the computing device, I/O data generated by the I/O device; encrypting, by the computing device, the I/O data to generate encrypted I/O data using the encryption key; encapsulating, by computing device, the encrypted I/O data into a message corresponding to the shared message topic; and publishing, by the computing device, the message to the remote message broker.

Example 30 includes the subject matter of any of Examples 27-29, and further comprising switching, by the computing device, from a local message broker of the computing device to the remote message broker in response to establishing the authenticated I/O redirect pairing.

Example 31 includes the subject matter of any of Examples 27-30, and further comprising unsubscribing, by the computing device, from the remote message broker in response to an un-pairing event associated with the authenticated I/O redirect pairing; removing, by the computing device, the pairing identifier from the message topic to generate a message topic indicative of the I/O device in response to the un-pairing event; and subscribing, by the computing device, to a local message broker using the message topic indicative of the I/O device.

Example 32 includes the subject matter of any of Examples 27-31, and wherein establishing the authenticated I/O redirect pairing with the second computing device comprises establishing a secure close-range data channel with the second computing device; transmitting a unique identifier of the computing device to the second computing device via the secure close-range data channel; transmitting the message topic to the second computing device via the secure close-range data channel; performing a secure key exchange to exchange the encryption key with the second computing device via the secure close-range data channel; and receiving the pairing identifier in response to transmitting the unique identifier to the second computing device.

Example 33 includes the subject matter of any of Examples 27-32, and wherein establishing the secure close-range data channel comprises establishing a personal area network connection or establishing a near-field communication connection.

Example 34 includes the subject matter of any of Examples 27-33, and further comprising generating, by the computing device, the encryption key; wherein performing the secure key exchange comprises performing the secure key exchange in response to generating the encryption key.

Example 35 includes the subject matter of any of Examples 27-34, and wherein receiving the pairing identifier comprises receiving the pairing identifier from an authentication server.

Example 36 includes the subject matter of any of Examples 27-35, and wherein establishing the authenticated I/O redirect pairing with the second computing device comprises receiving, by the computing device, a query for supported message topics from an authentication server; transmitting, by the computing device, the message topic to the authentication server in response to receiving the query for supported message topics; receiving, by the computing device, the encryption key from the authentication server; and receiving, by the computing device, the pairing identifier from the authentication server.

Example 37 includes the subject matter of any of Examples 27-36, and further comprising providing, by the computing device, the I/O data to an application of the computing device, wherein the I/O data is generated by the I/O device, and wherein the second computing device comprises the I/O device.

Example 38 includes the subject matter of any of Examples 27-37, and further comprising capturing, by the computing device, an I/O command generated by the application; encrypting, by the computing device, the I/O command to generate an encrypted I/O command using the encryption key; encapsulating, by computing device, the encrypted I/O command into a message corresponding to the shared message topic; and publishing, by the computing device, the message to the remote message broker.

Example 39 includes the subject matter of any of Examples 27-38, and further comprising generating, by the computing device, an un-pairing event associated with the authenticated I/O redirect pairing.

Example 40 includes the subject matter of any of Examples 27-39, and wherein establishing the authenticated I/O redirect pairing with the second computing device comprises establishing a secure close-range data channel with the second computing device; receiving a unique identifier of the second computing device from the second computing device via the secure close-range data channel; receiving the message topic from the second computing device via the secure close-range data channel; performing a secure key exchange to exchange the encryption key with the second computing device via the secure close-range data channel authenticating the computing device with an authentication server in response to receiving the unique identifier of the second computing device; and receiving the pairing identifier from the authentication server in response to authenticating the computing device.

Example 41 includes the subject matter of any of Examples 27-40, and wherein establishing the secure close-range data channel comprises establishing a personal area network connection or establishing a near-field communication connection.

Example 42 includes the subject matter of any of Examples 27-41, and wherein authenticating the computing device with the authentication server comprises transmitting the unique identifier of the second computing device to the authentication server.

Example 43 includes the subject matter of any of Examples 27-42, and further comprising generating, by the computing device, the encryption key; wherein performing the secure key exchange comprises performing the secure key exchange in response to generating the encryption key.

Example 44 includes the subject matter of any of Examples 27-43, and wherein establishing the authenticated I/O redirect pairing with the second computing device comprises transmitting, by the computing device, a request to access I/O devices of the second computing device to the authentication server, wherein the request identifies the second computing device; and receiving, by the computing device, the pairing identifier, the encryption key, and the message topic from the authentication server in response to transmitting the request.

Example 45 includes a method for establishing a secure I/O redirection pairing, the method comprising receiving, by a computing device from a consumer computing device, a request to redirect I/O to a provider computing device, wherein the request identifies the provider computing device; authenticating, by the computing device, the consumer computing device in response to receiving the request; generating, by the computing device, a pairing identifier in response to authenticating the consumer computing device; and transmitting, by the computing device, the pairing identifier to the consumer computing device and the provider computing device.

Example 46 includes the subject matter of Example 45, and wherein authenticating the consumer computing device comprises determining whether the consumer computing device is authorized to redirect I/O to the provider computing device.

Example 47 includes the subject matter of any of Examples 45 and 46, and further comprising commanding, by the computing device, the provider computing device to switch from a local message broker of the provider computing device to a remote message broker in response to authenticating the consumer computing device.

Example 48 includes the subject matter of any of Examples 45-47, and wherein the request comprises a unique device identifier of the provider computing device.

Example 49 includes the subject matter of any of Examples 45-48, and wherein the request comprises a domain name of the provider computing device.

Example 50 includes the subject matter of any of Examples 45-49, and further comprising generating, by the computing device, an encryption key in response to authenticating the consumer computing device; and transmitting, by the computing device, the encryption key to the consumer computing device and the provider computing device.

Example 51 includes the subject matter of any of Examples 45-50, and further comprising receiving, by the computing device, a message topic from the provider device, wherein the message topic is indicative of an I/O device of the provider computing device; and transmitting, by the computing device, the message topic to the consumer computing device in response to authenticating the consumer computing device Example 52 includes the subject matter of any of Examples 45-51, and further comprising querying, by the computing device, the provider computing device for supported message topics in response to authenticating the consumer computing device; wherein receiving the message topic from the provider device comprises receiving the message topic from the provider device in response to querying the provider computing device for the supported message topics.

Example 53 includes computing device comprising a processor; and a memory having stored therein a plurality of instructions that when executed by the processor cause the computing device to perform the method of any of Examples 27-52.

Example 54 includes one or more machine readable storage media comprising a plurality of instructions stored thereon that in response to being executed result in a computing device performing the method of any of Examples 27-52.

Example 55 a computing device comprising means for performing the method of any of Examples 27-52.

Example 56 includes a computing device for secure I/O redirection, the computing device comprising means for establishing an authenticated I/O redirect pairing with a second computing device, wherein the I/O redirect pairing is associated with a shared pairing identifier, a shared encryption key, and a shared message topic; means for subscribing to a remote message broker using the shared message topic, wherein the message topic is indicative of the pairing identifier and an I/O device; means for intercepting a message received from the remote message broker, wherein the message corresponds to the message topic; and means for decrypting the message using the encryption key to generate I/O data.

Example 57 includes the subject matter of Example 56, and further comprising means for providing the I/O data to the I/O device, wherein the I/O data comprises an I/O command and wherein the computing device includes the I/O device.

Example 58 includes the subject matter of any of Examples 56 and 57, and further comprising means for capturing I/O data generated by the I/O device; means for encrypting the I/O data to generate encrypted I/O data using the encryption key; means for encapsulating, by computing device, the encrypted I/O data into a message corresponding to the shared message topic; and means for publishing the message to the remote message broker.

Example 59 includes the subject matter of any of Examples 56-58, and further comprising means for switching from a local message broker of the computing device to the remote message broker in response to establishing the authenticated I/O redirect pairing.

Example 60 includes the subject matter of any of Examples 56-59, and further comprising means for unsubscribing from the remote message broker in response to an un-pairing event associated with the authenticated I/O redirect pairing; means for removing the pairing identifier from the message topic to generate a message topic indicative of the I/O device in response to the un-pairing event; and means for subscribing to a local message broker using the message topic indicative of the I/O device.

Example 61 includes the subject matter of any of Examples 56-60, and wherein the means for establishing the authenticated I/O redirect pairing with the second computing device comprises means for establishing a secure close-range data channel with the second computing device; means for transmitting a unique identifier of the computing device to the second computing device via the secure close-range data channel; means for transmitting the message topic to the second computing device via the secure close-range data channel; means for performing a secure key exchange to exchange the encryption key with the second computing device via the secure close-range data channel; and means for receiving the pairing identifier in response to transmitting the unique identifier to the second computing device.

Example 62 includes the subject matter of any of Examples 56-61, and wherein the means for establishing the secure close-range data channel comprises means for establishing a personal area network connection or establishing a near-field communication connection.

Example 63 includes the subject matter of any of Examples 56-62, and further comprising means for generating the encryption key; wherein the means for performing the secure key exchange comprises means for performing the secure key exchange in response to generating the encryption key.

Example 64 includes the subject matter of any of Examples 56-63, and wherein the means for receiving the pairing identifier comprises means for receiving the pairing identifier from an authentication server.

Example 65 includes the subject matter of any of Examples 56-64, and wherein the means for establishing the authenticated I/O redirect pairing with the second computing device comprises means for receiving a query for supported message topics from an authentication server; means for transmitting the message topic to the authentication server in response to receiving the query for supported message topics; means for receiving the encryption key from the authentication server; and means for receiving the pairing identifier from the authentication server.

Example 66 includes the subject matter of any of Examples 56-65, and further comprising means for providing the I/O data to an application of the computing device, wherein the I/O data is generated by the I/O device, and wherein the second computing device comprises the I/O device.

Example 67 includes the subject matter of any of Examples 56-66, and further comprising means for capturing an I/O command generated by the application; means for encrypting the I/O command to generate an encrypted I/O command using the encryption key; means for encapsulating, by computing device, the encrypted I/O command into a message corresponding to the shared message topic; and means for publishing the message to the remote message broker.

Example 68 includes the subject matter of any of Examples 56-67, and further comprising means for generating an un-pairing event associated with the authenticated I/O redirect pairing.

Example 69 includes the subject matter of any of Examples 56-68, and wherein the means for establishing the authenticated I/O redirect pairing with the second computing device comprises means for establishing a secure close-range data channel with the second computing device; means for receiving a unique identifier of the second computing device from the second computing device via the secure close-range data channel; means for receiving the message topic from the second computing device via the secure close-range data channel; means for performing a secure key exchange to exchange the encryption key with the second computing device via the secure close-range data channel means for authenticating the computing device with an authentication server in response to receiving the unique identifier of the second computing device; and means for receiving the pairing identifier from the authentication server in response to authenticating the computing device.

Example 70 includes the subject matter of any of Examples 56-69, and wherein the means for establishing the secure close-range data channel comprises means for establishing a personal area network connection or establishing a near-field communication connection.

Example 71 includes the subject matter of any of Examples 56-70, and wherein the means for means for authenticating the computing device with the authentication server comprises means for transmitting the unique identifier of the second computing device to the authentication server.

Example 72 includes the subject matter of any of Examples 56-71, and further comprising means for generating the encryption key; wherein the means for performing the secure key exchange comprises means for performing the secure key exchange in response to generating the encryption key.

Example 73 includes the subject matter of any of Examples 56-72, and wherein the means for establishing the authenticated I/O redirect pairing with the second computing device comprises means for transmitting a request to access I/O devices of the second computing device to the authentication server, wherein the request identifies the second computing device; and means for receiving the pairing identifier, the encryption key, and the message topic from the authentication server in response to transmitting the request.

Example 74 includes a computing device for establishing a secure I/O redirection pairing, the computing device comprising means for receiving, by the computing device from a consumer computing device, a request to redirect I/O to a provider computing device, wherein the request identifies the provider computing device; means for authenticating the consumer computing device in response to receiving the request; means for generating a pairing identifier in response to authenticating the consumer computing device; and means for transmitting the pairing identifier to the consumer computing device and the provider computing device.

Example 75 includes the subject matter of Example 74, and wherein the means for authenticating the consumer computing device comprises means for determining whether the consumer computing device is authorized to redirect I/O to the provider computing device.

Example 76 includes the subject matter of any of Examples 74 and 75, and further comprising means for commanding the provider computing device to switch from a local message broker of the provider computing device to a remote message broker in response to authenticating the consumer computing device.

Example 77 includes the subject matter of any of Examples 74-76, and wherein the request comprises a unique device identifier of the provider computing device.

Example 78 includes the subject matter of any of Examples 74-77, and wherein the request comprises a domain name of the provider computing device.

Example 79 includes the subject matter of any of Examples 74-78, and further comprising means for generating an encryption key in response to authenticating the consumer computing device; and means for transmitting the encryption key to the consumer computing device and the provider computing device.

Example 80 includes the subject matter of any of Examples 74-79, and further comprising means for receiving a message topic from the provider device, wherein the message topic is indicative of an I/O device of the provider computing device; and means for transmitting the message topic to the consumer computing device in response to authenticating the consumer computing device Example 81 includes the subject matter of any of Examples 74-80, and further comprising means for querying the provider computing device for supported message topics in response to authenticating the consumer computing device; wherein the means for receiving the message topic from the provider device comprises means for receiving the message topic from the provider device in response to querying the provider computing device for the supported message topics.

Example 82 includes a computing device for secure I/O redirection, the computing device comprising a pairing module to establish an authenticated I/O redirect pairing with a second computing device, wherein the I/O redirect pairing is associated with a shared pairing identifier, a shared encryption key, and a shared message topic; a messaging module to (i) subscribe to a remote message broker as a publisher and a listener using the shared message topic, wherein the message topic is indicative of the pairing identifier and an I/O device, and (ii) intercept a message received from the remote message broker, wherein the message corresponds to the message topic; and a redirection module to decrypt the message using the encryption key to generate I/O data.

Example 83 includes the subject matter of Examples 82, and wherein the computing device comprises the I/O device; and the redirection module is further to provide the I/O data to the I/O device, wherein the I/O data comprises an I/O command.

Example 84 includes the subject matter of any of Examples 82 and 83, and wherein the redirection module is further to (i) capture I/O data generated by the I/O device, (ii) encrypt the I/O data to generate encrypted I/O data using the encryption key, and (iii) encapsulate the encrypted I/O data into a message corresponding to the shared message topic; and the messaging module is further to publish the message to the remote message broker.

Example 85 includes the subject matter of any of Examples 82-84, and wherein the redirection module is further to provide the I/O data to an application of the computing device, wherein the I/O data is generated by the I/O device, and wherein the second computing device comprises the I/O device.

Example 86 includes the subject matter of any of Examples 82-85, and wherein the redirection module is further to (i) capture an I/O command generated by the application, (ii) encrypt the I/O command to generate an encrypted I/O command with the encryption key, and (iii) encapsulate the encrypted I/O command into a message that corresponds to the shared message topic; and the messaging module is further to publish the message to the remote message broker.

Example 87 includes a computing device for establishing a secure I/O redirection pairing, the computing device comprising a communication module to receive, from a consumer computing device, a request to redirect I/O to a provider computing device, wherein the request identifies the provider computing device; an authentication module to authenticate the consumer computing device in response to receipt of the request; and a pairing module to generate a pairing identifier in response to authentication of the consumer computing device; wherein the communication module is further to transmit the pairing identifier to the consumer computing device and the provider computing device.

Example 88 includes the subject matter of any of Example 87, and wherein the pairing module is further to generate an encryption key in response to the authentication of the consumer computing device; and the communication module is further to transmit the encryption key to the consumer computing device and the provider computing device.

Example 89 includes the subject matter of any of Examples 87 and 88, and wherein the communication module is further to receive a message topic from the provider device, wherein the message topic is indicative of an I/O device of the provider computing device; and transmit the message topic to the consumer computing device in response to the authentication of the consumer computing device.

The invention claimed is:

1. A computing device for secure I/O redirection, the computing device comprising:
a processor; and
one or more memory devices having stored therein a plurality of instructions that, when executed by the processor, cause the computing device to:
establish an authenticated I/O redirect pairing with a second computing device, wherein the I/O redirect pairing is associated with a shared pairing identifier, a shared encryption key, and a shared message topic, wherein the shared pairing identifier is shared by the computing device and the second computing device, and wherein the shared pairing identifier is received from an authentication server other than the second computing device;
subscribe to a remote message broker other than the second computing device using the shared message topic, wherein the shared message topic is indicative of the shared pairing identifier and a local identifier of an I/O device;
intercept a message received from the remote message broker, wherein the message corresponds to the shared message topic;
decrypt the message using the shared encryption key to obtain I/O data; and
provide the I/O data to an application of the computing device, wherein the I/O data is generated by the I/O device and the I/O data comprises an I/O command, and wherein the second computing device comprises the I/O device;
wherein to establish the authenticated I/O redirect pairing with the second computing device comprises to:
establish a secure close-range data channel with the second computing device;
communicate the local identifier of the I/O device with the second computing device via the secure close-range data channel;
perform a secure key exchange to exchange the shared encryption key with the second computing device via the secure close-range data channel; and
receive the shared pairing identifier from the authentication server via a communication channel other than the secure close-range data channel.

2. The computing device of claim 1, wherein the secure close-range data channel comprises a personal area network connection or a near-field communication connection.

3. The computing device of claim 1, wherein the plurality of instructions, when executed by the processor, further cause the computing device to:
capture a second I/O command generated by the application;
encrypt the second I/O command to generate an encrypted I/O command with the encryption key;
encapsulate the encrypted I/O command into a second message that corresponds to the shared message topic; and
publish the second message to the remote message broker.

4. The computing device of claim 1, wherein to establish the authenticated I/O redirect pairing with the second computing device comprises to:
receive a unique identifier of the second computing device from the second computing device via the secure close-range data channel;
receive the local identifier of the I/O device from the second computing device via the secure close-range data channel;
authenticate the computing device with the authentication server in response to receipt of the unique identifier of the second computing device; and
receive the shared pairing identifier from the authentication server in response to authentication of the computing device.

5. One or more non-transitory, computer-readable storage media comprising a plurality of instructions that in response to being executed cause a computing device to:
establish an authenticated I/O redirect pairing with a second computing device, wherein the I/O redirect pairing is associated with a shared pairing identifier, a shared encryption key, and a shared message topic; wherein the shared pairing identifier is shared by the computing device and the second computing device, and wherein the shared pairing identifier is received from an authentication server other than the second computing device;
subscribe to a remote message broker other than the second computing device using the shared message topic, wherein the shared message topic is indicative of the shared pairing identifier and a local identifier of an I/O device;
intercept a message received from the remote message broker, wherein the message corresponds to the shared message topic;

decrypt the message using the shared encryption key to obtain I/O data; and provide the I/O data to an application of the computing device, wherein the I/O data is generated by the I/O device and the I/O data comprises an I/O command, and wherein the second computing device comprises the I/O device;

wherein to establish the authenticated I/O redirect pairing with the second computing device comprises to:
  establish a secure close-range data channel with the second computing device;
  communicate the local identifier of the I/O device with the second computing device via the secure close-range data channel;
  perform a secure key exchange to exchange the shared encryption key with the second computing device via the secure close-range data channel; and
  receive the shared pairing identifier from the authentication server via a communication channel other than the secure close-range data channel.

6. The one or more non-transitory, computer-readable storage media of claim 5, further comprising a plurality of instructions that in response to being executed cause the computing device to:

capture a second I/O command generated by the application;

encrypt the second I/O command to generate an encrypted I/O command using the encryption key;

encapsulate, by computing device, the encrypted I/O command into a second message corresponding to the shared message topic; and publish the second message to the remote message broker.

7. The one or more non-transitory, computer-readable storage media of claim 5, wherein to establish the authenticated I/O redirect pairing with the second computing device comprise to:

receive a unique identifier of the second computing device from the second computing device via the secure close-range data channel;

receive the local identifier of the I/O device from the second computing device via the secure close-range data channel;

authenticate the computing device with the authentication server in response to receiving the unique identifier of the second computing device; and receive the shared pairing identifier from the authentication server in response to authenticating the computing device.

\* \* \* \* \*